United States Patent [19]

Titterington et al.

[11] Patent Number: 5,372,852
[45] Date of Patent: Dec. 13, 1994

[54] INDIRECT PRINTING PROCESS FOR APPLYING SELECTIVE PHASE CHANGE INK COMPOSITIONS TO SUBSTRATES

[75] Inventors: Donald R. Titterington, Tualatin; Loc V. Bui; Linda M. Hirschy, both of Portland; Harold (Hal) R. Frame, Gaston, all of Oreg.

[73] Assignee: Tektronix, Inc., Wilsonville, Oreg.

[21] Appl. No.: 981,677

[22] Filed: Nov. 25, 1992

[51] Int. Cl.⁵ .............................................. B05D 5/06
[52] U.S. Cl. ................................... 427/288; 427/256; 346/25
[58] Field of Search ................. 427/256, 288; 346/25, 346/1.1, 140 R; 106/20 D; 101/487, 491

[56] References Cited

U.S. PATENT DOCUMENTS

| | | |
|---|---|---|
| 3,653,932 | 4/1972 | Berry et al. |
| 3,715,219 | 2/1973 | Kurz et al. |
| 4,293,866 | 10/1981 | Takita et al. ............... 346/140 R |
| 4,390,369 | 6/1983 | Merritt et al. |
| 4,484,948 | 11/1984 | Merritt et al. |
| 4,659,383 | 4/1987 | Lin et al. |
| 4,684,956 | 8/1987 | Ball |
| 4,830,671 | 5/1989 | Frihart et al. |
| 4,855,763 | 8/1989 | Kan et al. ............... 346/155 |
| 4,889,560 | 12/1989 | Jaeger et al. |
| 4,889,761 | 12/1989 | Titterington et al. |
| 4,992,304 | 2/1991 | Tetterington |
| 5,084,099 | 1/1992 | Jaeger et al. |
| 5,099,256 | 3/1992 | Anderson ............... 346/1.1 |
| 5,168,289 | 12/1992 | Katakabe et al. ............... 400/120 |
| 5,268,052 | 12/1993 | Takizaza et al. ............... 427/288 |

FOREIGN PATENT DOCUMENTS

WO91/10711 7/1991 WIPO.

OTHER PUBLICATIONS

"Analysis of Polymer Ink Transfer Phenomenon in Thermal Transfer Printing Technology" by Akutsu et al. from IS& T's 8th International Congress on Advances in Non-Impact Printing Technologies (1992).

Primary Examiner—Terry J. Owens
Attorney, Agent, or Firm—Ralph D'Alessandro

[57] ABSTRACT

A phase change ink composition is indirectly applied to a substrate by raising the temperature of the phase change ink composition to form a liquid phase change ink composition, applying droplets of the phase change ink composition in a liquid phase to a liquid intermediate transfer surface on a solid support in a pattern using a device such as an ink jet printhead, solidifying the phase change ink composition on the liquid intermediate transfer surface, transferring the phase change ink composition from the liquid intermediate transfer surface to the substrate, and fixing the phase change ink composition to the substrate. The phase change ink composition is malleable when the ink is transferred from the intermediate transfer surface to the substrate and is ductile after the ink has been transferred to the substrate and cooled to ambient temperature to preclude the ink from crumbling and cracking.

38 Claims, 13 Drawing Sheets

INDIRECT PRINTING PROCESS FOR APPLYING SELECTIVE PHASE CHANGE INK COMPOSITIONS TO SUBSTRATES

BACKGROUND OF THE INVENTION

The present invention generally relates to selective phase change ink compositions and to a process for applying same to substrates, and more particularly to the application and use of such inks in a process in which phase change compositions having selective process capabilities are applied to a substrate in indirect printing processes where intermediate transfer surfaces are employed.

In general, phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops.

The phase change ink comprises a phase change ink carrier composition which is combined with a phase change ink compatible colorant. Preferably, a colored phase change ink will be formed by combining the above-described ink carrier composition with compatible subtractive primary colorants. The subtractive primary colored phase change inks of this invention comprise four component dyes, namely, cyan, magenta, yellow and black. The subtractive primary colorants employed typically comprise dyes from either class of Color Index (C.I.) Solvent Dyes, Disperse Dyes, modified Acid and Direct Dyes, and a limited number of Basic Dyes.

Phase change ink is desirable since it remains in a solid phase at room temperature, during shipping, long-term storage, etc. Also, the problems associated with nozzle clogging due to ink evaporation are largely eliminated, thereby improving the reliability of ink jet printing. Furthermore, in prior art phase change ink jet printers where the ink droplets are applied directly onto the printing medium the droplets solidify immediately upon contact with the substrate, migration of ink along the printing medium is prevented and dot quality is improved. This is also true of the processes and ink compositions described herein.

The initial prior art on the direct application of phase change inks in ink jet printing involved monochrome inks jetted by electrostatic printing devices. Thus, for example, in U.S. Pat. No. 3,653,932, a low melting ink, 30 degrees Centigrade (°C.) to 50° C., is provided employing an ink base comprising diesters of sebacic acid. In a similar process, U.S. Pat. No. 3,715,219 describes another low melting point ink (30° C. to 60° C.) comprising a paraffin alcohol-based ink. However, when low melting point phase change inks are employed in printing onto a substrate, they exhibit offset problems, namely, when the printed substrates formed from these inks are stacked and stored for subsequent use, they can become adhered to one another, particularly if high ambient temperatures are experienced.

U.S. Pat. No. 4,390,369 and U.S. Pat. No. 4,484,948 describe methods for producing monochrome phase change inks which employ a natural wax ink base, such as Japan wax, candelilla wax, carnauba wax, etc., which is printed by direct application from a drop-on-demand ink jet device at a temperature ranging between 65° C. and 75° C. In U.S. Pat. No. 4,659,383, a monochrome ink composition is provided having an ink base comprising a C20-24 acid or alcohol, a ketone, and an acrylic resin plasticizer. These monochrome ink compositions are not durable and when printed by direct application can be smudged with routine handling and folding.

In Japanese patent application 128,053/78, amides which are solid at room temperature, such as acetamide, are employed as printing inks. U.S. Pat. No. 4,684,956 is directed to monochrome phase change inks utilizing synthetic microcrystalline wax (hydrocarbon wax) and microcrystalline polyethylene wax. This molten composition can be applied to a variety of porous and non-porous substrates using a drop-on-demand ink jet direct application technique.

EP 0177352 and EP 0206286 reference direct phase change ink jet printing in color. The ink bases for these systems comprise fatty acids, a thermoplastic polyethylene and a phase change material in the first application; and the alcohol portion of a thermal setting resin pair, a mixture of organic solvents (o- and p-toluene sulfonamide) and a dye in the second application.

In U.S. Pat. No. 4,830,671, a hot-melt or phase change color ink composition is provided having the properties of stability and uniformity of performance under ink jet printing conditions. The resinous binder for the above-described phase change ink is the condensation reaction product of one equivalent of polymerized fatty acid, two equivalents of diamine and two equivalents of a monocarboxylic acid.

In PCT publication WO 91/10711, a hot melt ink for direct application by ink jet printing is provided. The colored ink jet images have a relatively narrow melting range and inhibit crystallinity upon quenching to reduce attenuation of transmitted light. Phase change ink compositions for direct application onto an underlying substrate are described in U.S. Pat. No. 4,889,560, U.S. Pat. No. 4,889,761, U.S. Pat. No. 4,992,304, U.S. Pat. No. 5,084,099, all of which are assigned to the assignee of this patent application, and all of which are incorporated herein by reference in pertinent part.

The carrier composition of phase change inks preferably includes a fatty amide-containing compound. It may also include plasticizers and tackifiers. Thin films of substantially uniform thickness of this ink composition are rectilinearly light transmissive, so that the inks are suitable for preparing overhead transparencies when used in the manner described in the patents just referenced above.

All of the above-described prior art relates to direct phase change ink processes in which the ink is jetted in the form of discrete drops directly onto a substrate. In prior art phase change ink systems, such as U.S. Pat. No. 4,889,560, special selective process capabilities are not required because the phase change ink is applied directly to the substrate by the use of an ink jet printing process. However, phase change inks which work in direct processes do not necessarily perform satisfactorily in indirect processes where the inks are first applied to an intermediate transfer surface and then to the final receiving substrate or surface. These problems are solved by the present invention which relates to phase change ink compositions with selective process capabilities.

SUMMARY OF THE INVENTION

The phase change ink of the present invention is indirectly applied to the substrate via an intermediate transfer surface. Thus, it is first deposited onto an intermediate transfer surface in a linewise fashion, as will be described hereinafter. The pattern of phase change ink on the intermediate transfer surface is then contact transferred to the substrate.

The indirect application via an intermediate transfer surface of phase change inks by the process of the present invention requires certain mechanical and physical properties which are necessary to produce a printed substrate by applying a phase change ink composition first to an intermediate surface and then to a final receiving surface or substrate. The invention includes combining a phase change compatible colorant with a modified phase change ink carrier composition to unexpectedly produce an ink with specific desired fluidic and mechanical properties which meets the parameters needed for indirect application. It also includes providing a process for the indirect application via an intermediate transfer surface of said phase change ink composition to a final receiving surface or substrate to which the phase change ink composition is fixed to produce a finished printed substrate.

Typically, the phase change ink composition of the present invention is formulated by combining a modified phase change ink carrier composition having selective process capabilities with a phase change compatible colorant composition. The selective phase change ink composition produced thereby, after it is formulated, is typically cast into solid ink sticks and placed into an ink jet printing device. Then, the temperature is raised to a first elevated operating temperature where a liquid phase with selective fluidic properties is formed. The ink is then typically held as a liquid at this relatively high operating temperature in the reservoir and print head of an ink jet printer.

The liquid phase ink composition can then be indirectly applied in a predetermined pattern to a substrate. For example, the ink composition can then be deposited onto an intermediate transfer surface. The intermediate transfer surface is a liquid layer that is applied to the supporting surface, which is preferably a drum, but which may also be a web, platen, or any other suitable design, by contact with an applicator, such as a metering blade, roller, web or most preferably a wicking pad contained within an applicator assembly. The ink composition is maintained as a solid, in a predetermined pattern on the intermediate transfer surface. The intermediate transfer surface is held at an intermediate temperature, which is below the melting point of the ink formulation, but is above ambient temperature. At this intermediate temperature, the ink is malleable and has specified mechanical properties which enable it to be used in subsequent steps of the process.

During the next step the ink is transferred in an "imagewise" or "pagewise" fashion to the final substrate by use of a pressure nip where the specified pressure is above the compressive yield strength of the solid, malleable ink at the intermediate temperature mentioned above. Preferably, the final receiving substrate or surface is heated to a temperature greater than the intermediate temperature prior to being fed into the nip where it is brought into contact with the malleable ink droplets that form a desired image or pattern. During this transfer step the ink droplets are flattened, spread, and, in the case of paper substrates, fused into the substrate. The final step in the process is removal of the final substrate from the pressure nip and separation of the substrate and ink layer from the intermediate transfer surface. During this step the ink must retain enough cohesive strength to resist cohesive failure due to the tensile forces it experiences as it is peeled from the transfer surface. Thin films of uniform thickness of the phase change ink composition on the final receiving substrate when cooled to the ambient temperature must be ductile and retain sufficient flexibility so the image will not fracture upon bending, while possessing a high degree of lightness, chroma, transparency and thermal stability.

It has been determined in an indirect application process employing an intermediate transfer surface that a phase change ink composition must have certain fluidic and mechanical properties in order to produce a printed substrate of high quality. These desirable properties of the phase change ink compositions of this invention in the solid state are specified and measured by using several analytical techniques. One such technique is dynamic mechanical analyses (DMA). DMA is a technique capable of measuring the viscoelastic properties of a material and identifying the viscoelastic properties of a material and identifying the material's elastic and viscous components. The measurements are made by subjecting the ink composition to an alternating (oscillatory or dynamic) strain and simultaneously measuring the alternating stresses and phase angles at different frequencies and temperatures. The dynamic stress ($\sigma^*$) of an ink composition can be separated into two components. These are the "elastic stress" component which is the magnitude of the portion of the applied force in phase with the applied strain, and the "viscous stress" component, which is the magnitude of the portion of the applied force out of phase with the applied strain. The dynamic modulus ($E^*$) can be determined from the ratio of dynamic stress over strain. Correspondingly, it can be broken down into the in-phase component of the modulus, $E'$, and the out-of-phase component of the modulus, $E''$. $E'$ defines the energy stored in a specimen under an applied strain. $E'$ is determined by the equation $E' = \sigma_o/\epsilon_o (\cos\delta)$. $E''$ defines the energy loss due to viscous dissipation under an applied strain. $E''$ is determined by the equation $E'' = \sigma_o/\epsilon_o (\sin\delta)$.

The phase angle ($\delta$) is the lag in the measured stresses to an applied strain due to the viscoelastic nature of the material. The loss tangent (tan $\delta$) is the ratio of loss modulus over storage modulus. Tan $\delta$ is often referred to as the dissipation (damping) factor, i.e., the ratio of energy dissipated per cycle to the maximum potential energy stored during a cycle. Finally, the glass transition temperature ($T_g$) is a temperature at which there is a large drop in modulus, about 0.5 to about 3 orders of magnitude, accompanied by a definite peak of the tan $\delta$. Below the $T_g$, the material behaves like a brittle solid. At the $T_g$, the material acts like a leathery solid and is capable of dissipating energy. Above the $T_g$, the material is similar to a rubbery solid. Dynamic properties are usually plotted in terms of $E'$, $E''$ and tan $\delta$ as a function of temperature at a constant frequency or as a function of frequency at a constant temperature. Through the entitled, "Viscoelastic Properties of Polymers", Chapter 11, pages 264–320, 3rd Edition by John D. Ferry; it is understood that the effect of changing temperature will correspond to a shift along the frequency axis for all relaxation processes, without appreciable change in magnitude of all of these relaxation processes.

Another of the mechanical analytical techniques mentioned above is compressive yield testing on bulk samples of the phase change ink compositions. Yield stress is the point on the stress-strain curve at which the material continues to deform without an increase in stress. This is important in the printing process mentioned above since it determines the pressure needed to spread the solid, malleable ink droplets into a continuous thin film during the transfer process.

There are various types of deformation the ink undergoes in compression as a function of temperature or rate. An ink can be classified as being brittle if it fails by the shearing and fracturing of the molecular bonds. This is typified by low elongation (which is directly proportional to strain) and moderate to high stress. Since the integration of the area under the stress-strain curve is a measure of the toughness of the material, a brittle material is strong, but not tough. The brittle behavior is detrimental to the durability of the ink on substrates because it is both low in elongation (i.e. not very ductile or flexible) and toughness (i.e. the ability to dissipate energy).

An ink is considered to be ductile if it fails by sliding the molecules over each other and flowing. This is typified by high elongation and toughness. Ductile behavior is desirable for a printing process involving transfer and fusing or fixing because it allows the ink to spread by flowing under an applied pressure without fracturing.

Shear banding is the transition between the ductile and weak behavior, where the ink loses its cohesive strength. Shear bands are typified by 45° angle crisscrossed bands that indicate the ink is weakening. Weak behavior is characterized by the crumbling behavior of the ink. This is due to the loss in cohesive strength of the material. It is theorized that this occurs once short molecules have flowed past one another at high elongation. The weak behavior is to be avoided during the image transfer and fusing steps because it leads to poor durability of the ink on substrates, poor rectilinear light transmission of the ink, and poor transfer efficiency during printing.

The phase change ink compositions as finally applied to the substrate make a finished print exhibiting excellent color properties. Thin films of uniform thickness of the phase change ink composition are rectilinearly light transmissive and exhibit exemplary C*ab and L* values as hereinafter described.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 12 is a plot of the yield stress as a function of temperature for formulation F of Example 7.

BRIEF DESCRIPTION OF A PREFERRED EMBODIMENT OF THE INVENTION

Figure 1:
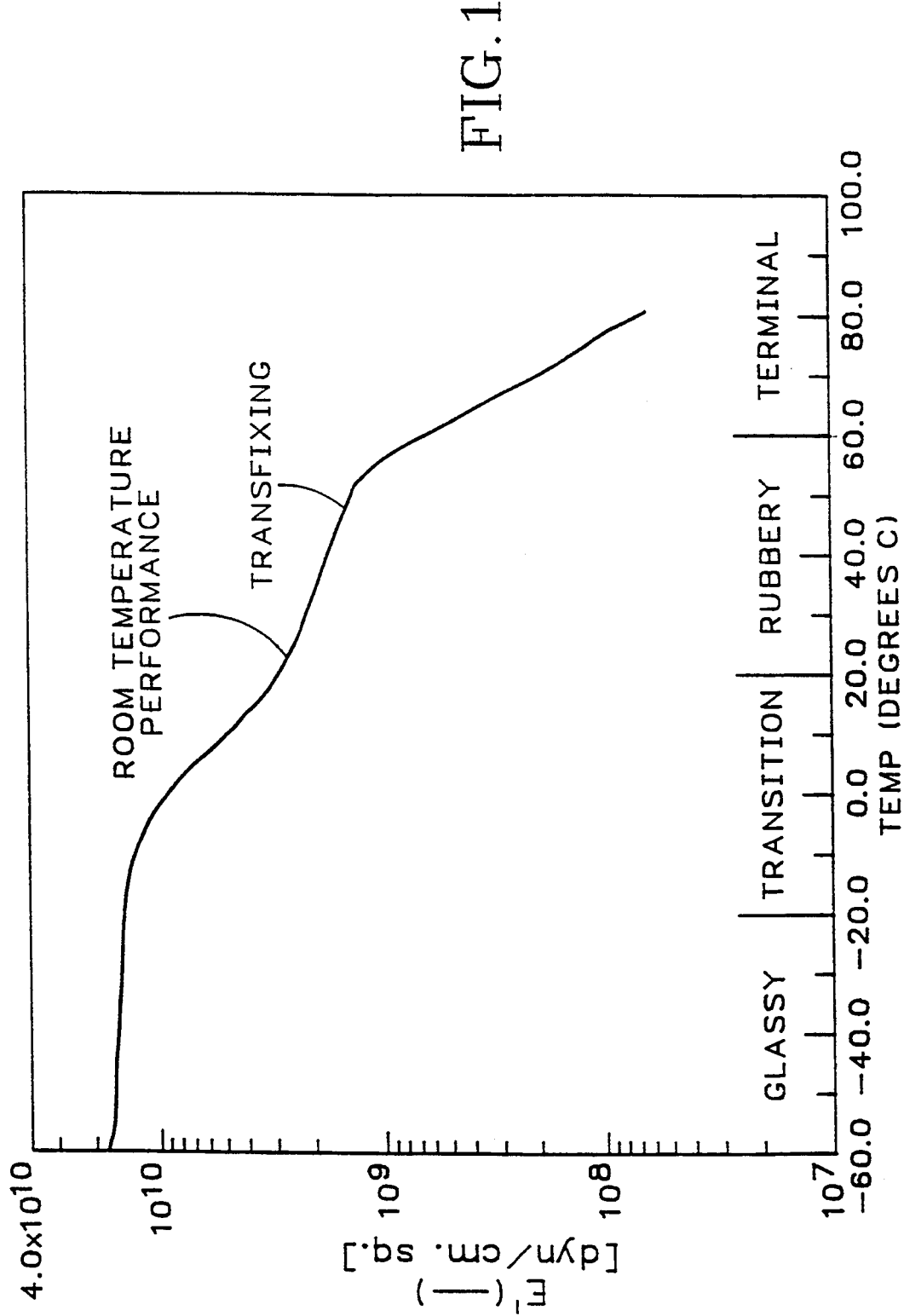
FIG. 1 is a generalized illustration of the storage modulus, E', as a function of temperature at about 1 Hz for an appropriate phase change ink composition of the present invention.

This invention comprises selective phase change ink compositions for use in a process by which such compositions are indirectly applied via an intermediate transfer surface to a final receiving surface or substrate. The selective phase change ink compositions of the instant invention comprise a phase change ink colorant composition and a modified phase change ink carrier composition. The modified phase change ink carrier composition is formulated so that it produces a selective ink composition having predetermined fluidic and mechanical properties which meet the parameters required for the indirect application via an intermediate transfer surface of the ink composition to a final receiving substrate.

The modified base phase change ink carrier composition typically comprises a fatty amide-containing material. The fatty amide-containing material of the modified phase change ink carrier is a tetra-amide compound. The preferred tetra-amide compounds for producing the modified phase change ink carrier composition are dimer acid-based tetra-amides which preferably include the reaction product of a fatty acid, a diamine (ethylene diamine) and a dimer acid. For purposes of this invention, the term "dimer acid" preferably means a hydrogenated oleic acid dimer product. A preferred example of such a dimer acid is a product known as EMPOL 1008 Dimer Acid, manufactured by the Emery Division of Henkel Corporation of Cincinnati, Ohio. Fatty acids having from 10 to 22 carbon atoms are preferably employed in the formation of the dimer acid-based tetra-amide. These dimer acid-based tetra-amides are produced by Union Camp and comprise the reaction product of ethylene diamine, dimer acid, and the following fatty acids: decanoic acid (Union Camp X3203-23), myristic acid (Union Camp X3202-56), stearic acid (Union Camp X3138-43, X3164-23, X3202-44, X3202-46, X3222-655, X3261-37, X3261-53, and X3290-72), and docosanoic acid (Union Camp X3202-36). For the purposes of this invention, the most preferred dimer acid based tetra-amide is the reaction product of dimer acid, ethylene diamine and stearic acid in the stoichiometric ratio of 1:2:2. Stearic acid is the preferred fatty acid reactant because its adduct with dimer acid and ethylene diamine has the lowest viscosity of the dimer acid based tetra-amides. Its ingredients also are the most readily available and, therefore, lowest in cost.

The fatty amide-containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides, stearamide, such as KEMAMIDE S, manufactured by Witco Chemical Company, can be employed herein. As for the secondary mono-amides, behenyl benenamide (KEMAMIDE EX-666), and stearyl stearamide (KEMAMIDE S-230 and KEMAMIDE EX-672), all manufactured by Witco Chemical Company, are extremely useful mono-amides. However, stearyl stearamide is the mono-amide of choice in producing the modified phase change ink carrier composition of the present invention.

The preferred fatty amide-containing compounds of this invention comprise a plurality of fatty amide materials which are compatible with each other. Typically, even when a plurality of fatty amide-containing compounds are employed to produce the modified phase change ink carrier composition, the modified carrier composition has a substantially single melting point transition. The melting point of the phase change ink carrier composition is preferably at least about 85° C.

The preferred modified phase change ink carrier composition comprises a tetra-amide and a mono-amide. The weight ratio of the tetra-amide to the mono-amide in the preferred instance is from about 2:1 to about 1:10, and more preferably, from about 1:1 to about 1:3.

Various modifying agents can be added to a phase change ink carrier composition. However, only certain of these modifying agents which are employed in a manner which will produce a phase change ink composition having the properties which meet the parameters required for indirect application to the substrate fall within the scope of this invention. For example, a preferred modifying agent includes certain tackifiers. The preferred tackifiers encompass those which are compatible with fatty amide-containing materials. These include, for example, KE-311 Resin, a glycerol ester of hydrogenated abietic (rosin) acid made by Arakawa Chemical Industries, Ltd., FORAL 85, a glycerol ester of hydrogenated abietic (rosin) acid, FORAL 105, a pentaerythritol ester of hydroabietic (rosin) acid, CELLOLYN 21, a hydroabietic(rosin) alcohol ester of phthalic acid, all manufactured by Hercules Chemical Company, NEVTAC 2300 and NEVTAC 80, synthetic polyterpene resins manufactured by Neville Chemical Company, and WINGTACK 86, a modified synthetic polyterpene resin manufactured by Goodyear Chemical Company. The most preferred tackifier, however, is KE-311.

Another of the preferred modifying agents which can be added to the formulation are certain plasticizers. For instance, many of the phthalate ester plasticizers sold by Monsanto under the traded name "SANTICIZER" are suitable for this purpose. However, the preferred plasticizer is SANTICIZER 278, which is the mixed di-ester of phthalic acid with benzyl alcohol and "TEXANOL".

Other additives may be combined with the phase change ink carrier composition. In a typical phase change ink chemical composition antioxidants are added for preventing discoloration of the carrier composition. The preferred antioxidant materials can include IRGANOX 1010 manufactured by Ciba Geigy; and NAUGARD 76, NAUGARD 512, and NAUGARD 524 manufactured by Uniroyal Chemical Company. However, the most preferred antioxidant is NAUGARD 524.

While the modifying agents mentioned above are used for the preferred embodiments of this invention, other materials with similar properties can be combined with or used to produce different phase change ink compositions with mechanical and fluidic properties similar to those outlined above. These other materials can include paraffins, microcrystalline waxes, polyethylene waxes, ester waxes, oligomers or low molecular weight polymers and copolymers such as EVA, ethylene/acrylic acid copolymers, EVA/acrylic acid copolymers, ionomers, copolymers of acrylic acid with polyamides, and the like.

In a preferred case, the phase change ink carrier composition comprises a tetra-amide and a mono-amide compound and a modifying agent which includes a tackifier, a plasticizer, and an antioxidant. The preferred compositional ranges of this phase change ink carrier composition are as follows: from about 10 to about 50 weight percent of a tetra-amide compound, from about 30 to about 80 weight percent of a mono-amide compound, from about 0 to about 40 weight percent of a tackifier, from about 0 to about 30 weight percent of a plasticizer and about 0 to about 2 percent of an antioxidant.

Another important property of phase change inks is viscosity. The viscosity of the molten ink must be matched to the requirements of the ink jet device and optimized versus other physical properties of the ink. For purposes of this invention, the viscosity of the phase change ink is measured on a Ferranti-Shirley cone plate viscometer with a large cone. It is preferred that the viscosity of the phase change ink carrier composition at 140° C., and in turn the ink composition of this invention, is from about 5 to about 30 centipoise, more preferably from about 10 to about 20 centipoise, and most preferably from about 11 to about 15 centipoise.

As previously indicated, the subject phase change ink formed from the phase change ink carrier composition exhibit excellent physical properties. For example, the subject phase change ink, unlike prior art phase change inks, exhibits a high level of lightness, chroma, and rectilinear light transmissivity when utilized in a thin film of substantially uniform thickness, so that color images can be conveyed using overhead projection techniques. Furthermore, the preferred phase change ink compositions exhibit the preferred mechanical and fluidic properties mentioned above when measured by DMA, compressive yield testing and viscometry, and more importantly, work well when used in the indirect printing process described in co-pending application U.S. Ser. No. 07/981,646, filed Nov. 25, 1992 and assigned to the assignee of the present invention.

Figure 13:
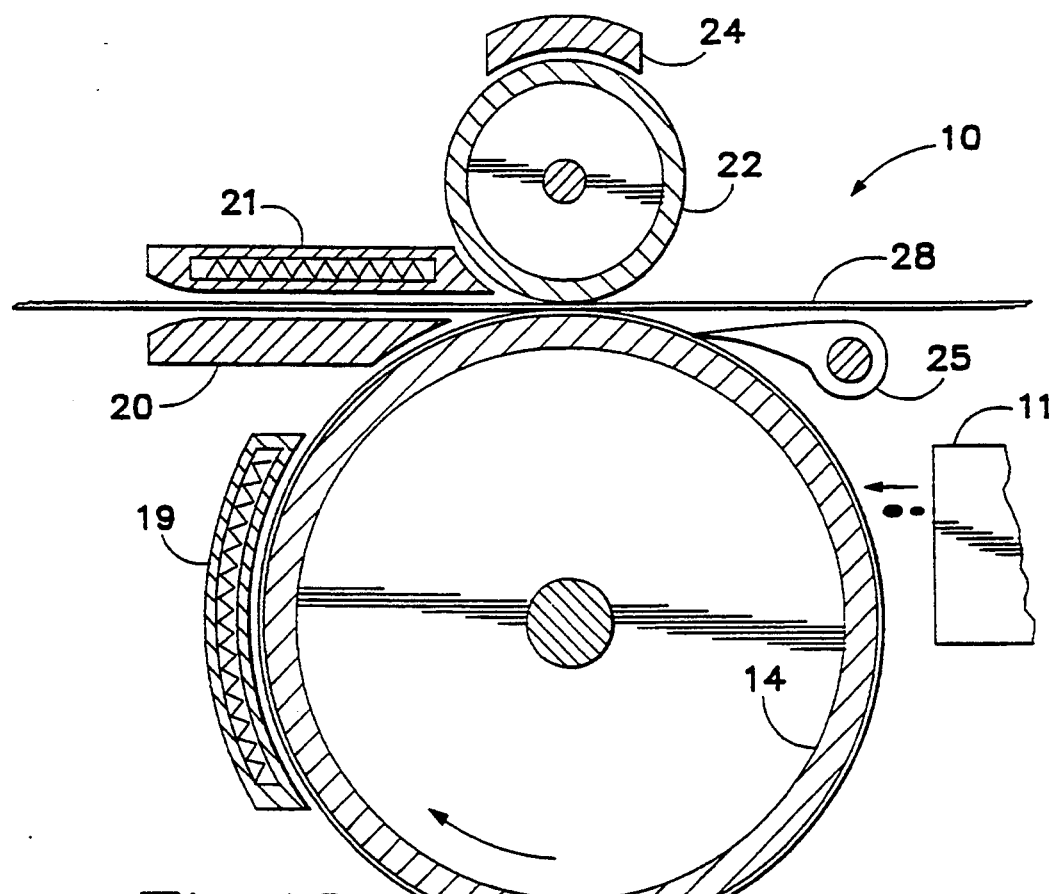
FIG. 13 is a diagrammatic illustration of the process of applying a phase change ink to an intermediate transfer surface for subsequent transfer to a substrate.

While the thickness of the liquid layer forming the intermediate transfer surface 12 of FIG. 13 on the supporting surface or drum 14 can be measured, such as by the use of reflectance Fourier Transform infrared spectroscopy or a laser interferometer, it is theorized that the thickness can vary from about 0.05 microns to about 60 microns, more preferably from about 0.1 to about 50, and most preferably from about 1 to about 10 microns. The thickness of the layer forming the intermediate transfer surface 12 can increase if rougher surfaced supporting surfaces or drums 14 are employed. The surface topography of the supporting surface or drum 14 can have a roughness average ($R_a$) of from about 1 microinch to about 100 microinches, and a more preferred range of from about 5 to about 15 microinches. The image quality will degrade when a liquid layer thicker than about 60 microns is used to form the intermediate transfer surface 12 applied by applicator 15 connected to web applicator support 18 contained within retractable applicator apparatus 16. The stripper fingers 25 (only one of which is shown) of FIGS. 13 and 15 assist in stripping the final receiving substrate 28 from the liquid layer 12. Guide 20 directs the final receiving medium or substrate 28 between the supporting surface 14 and the fixing roller 22.

Suitable liquids that may be employed as the intermediate transfer surface 12 include water, fluorinated oils, glycol, surfactants, mineral oil, silicone oil, functional oils or combinations thereof. Functional oils can include, but are not limited to, mercaptosilicone oils, fluorinated silicone oils and the like.

Figure 14:
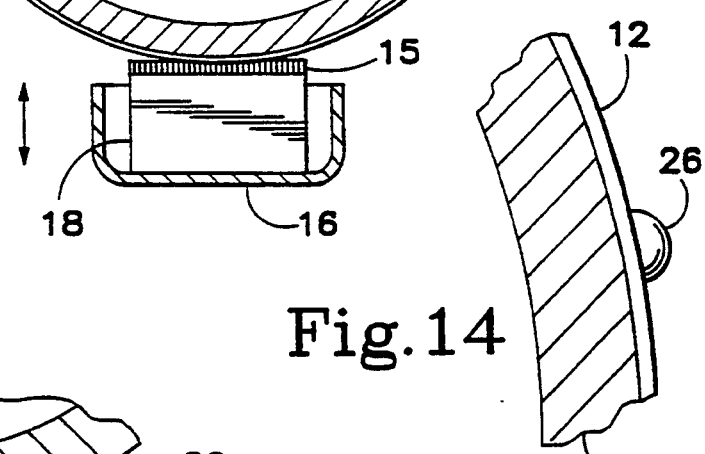
FIG. 14 is an enlarged diagrammatic illustration of the liquid layer acting as an intermediate transfer surface supporting the ink.
Figure 15:
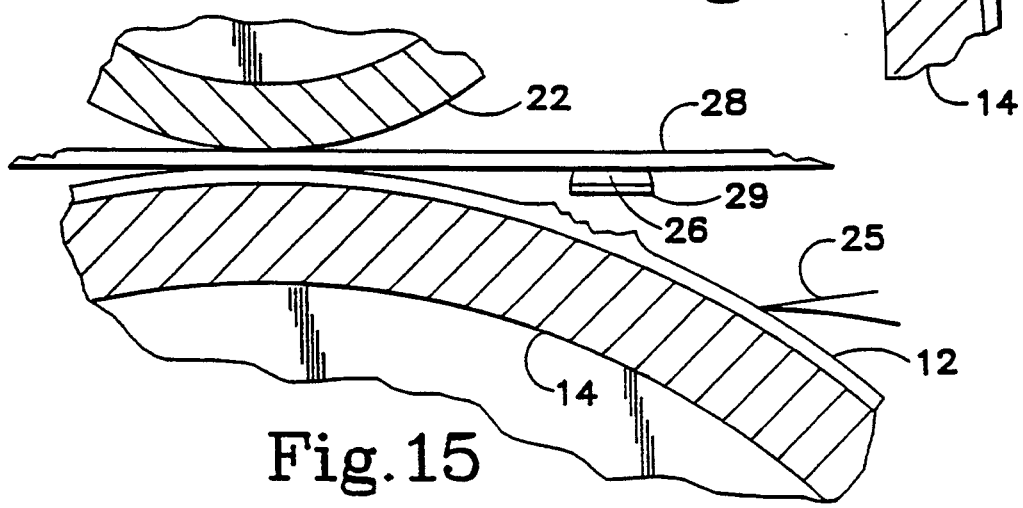
FIG. 15 is an enlarged diagrammatic illustration of the transfer of the inked image from the liquid intermediate transfer surface to a final receiving surface.

The supporting surface 14 may be formed from any appropriate material, such as metals including but not limited to aluminum, nickel or iron phosphate, elastomers including but not limited to fluoroelastomers, perfluoroelastomers, silicone rubber and polybutadiene, plastics including but not limited to polytetrafluorethylene loaded with polyphenylene sulfide, thermoplastics such as polyethylene, nylon, and FEP (fluorinated ethylene propylene copolymer), thermosets such as acetals, or ceramics could be employed as long as the exposed surface is sufficiently rigid to deform the transferred image-forming ink 26 when the final receiving medium passes between it and the transfer and fixing roller 22 and sufficiently smooth so as not to interfere with the ability of the intermediate transfer surface or liquid layer to support the image-forming ink 26 of FIGS. 14 and 15. The preferred material is anodized aluminum.

The transmission spectra for each of the phase change inks used in the process of this invention were evaluated on a commercially available spectrophotometer, the ACS SPECTRO-SENSOR II, in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the inks used in the process and as a part of this invention, measurement data were reduced, via tristimulus integration, following ASTM E308 (Standard Method for Computing the Colors of Objects using the CIE System) in order to calculate the 1976 CIE $L^*$ (Lightness), $a^*$ (redness-greenness), and $b^*$ (yellowness-blueness) CIELAB values for each phase change ink sample. In addition, the values for CIELAB Psychometric Chroma, $C^*_{ab}$, and CIELAB Psychometric Hue Angle, were calculated according to publication CIE15.2, Colorimetry (Second Edition, Central Bureau de la CIE, Vienna, 1986).

Unlike conventional phase change ink carriers, the nature of the phase change ink used in the process of the present invention is such that thin films of substantially uniform thickness exhibit a relatively high $L^*$ value. For example, a substantially uniform thin film of about 20 micron thickness of the phase change ink of this invention preferably has an $L^*$ value of at least about 65, more preferably at least about 75, and most preferably at least about 85.

The phase change inks used herein have a relatively high $C^*ab$ value when measured as a thin film of substantially uniform thickness. Previously, conventional phase change inks have had a very low degree of rectilinear light transmissivity, even in thin films of substantially uniform thickness. The phase change ink composition used in the process of this invention has $C^*ab$ values, when applied as a substantially uniform thin film of about 10 micron thickness with subtractive primary yellow, magenta and cyan color phase change ink compositions, that preferably are at least about 40 for said yellow ink composition, at least about 65 for said magenta ink composition, and at least about 30 for the cyan ink composition.

It is also important that the black color phase change ink component be at a minimum light transmissivity level so that the color intensity of the ink is maximized. Accordingly, the $L^*$ value of a substantially uniformly thin film of about 10 microns thickness of a black color phase change ink is preferably not more than about 35, more preferably not more than about 30, and most preferably not more than about 25.

The respective phase change ink and ink carrier compositions, when transferred to the final substrate in a thin film, are quite durable. One indication of durability is abrasion resistance. For purposes of this invention, abrasion resistance is determined by testing a finished print sample of the phase change ink produced from the carrier composition in a Teledyne TABER ABRADER, Model 5130, utilizing CS-230 Abrasion wheels loaded with 500 gram weights. The abrasion wheels are resurfaced after each sample with an S-11 resurfacing disk. Samples printed on paper were tested according to ASTM D406(F84 (Standard Test Method For Abrasion Resistance of Organic Coatings by the TABER ABRADER). Samples printed on light transmissive thin films were tested using ASTM D1304Q-85 (Standard Test Method For Resistance of Transparent Plastics to Surface Abrasion). Print samples were tested as described above, and the results of those tests demonstrated excellent abrasion resistance.

A further test employed to evaluate the durability of phase change inks and ink carrier compositions is an offset transfer or blocking test. This determines whether the phase change ink printed on a substrate will adhere to an adjacent substrate at ambient or elevated temperatures when the printed products are stacked one on top of the other. The blocking test is conducted using an indirect transfer method by printing samples of the phase change ink produced from the carrier composition onto a paper or thin film substrate and placing that substrate in a manila folder under a one pound piece of aluminum, about 8.5 inches wide and about 11 inches long to evenly distribute the weight of a 10 pound block. These printed samples are placed in an oven for 24 hours at a constant temperature of about 60° C. Print samples of the phase change ink of the present invention, subjected to the above described blocking test showed no blocking.

The above-defined DMA properties of the phase change ink compositions were experimentally determined. These dynamic measurements were done on the RHEOMETRICS SOLIDS ANALYZER (RSA II) manufactured by Rheometrics, Inc. of Piscataway, N.J., using a dual cantilever beam geometry. The dimensions of the sample were about $2.0\pm1.0$ mm thick, about $6.5\pm0.5$ mm wide, about $54.0\pm1.0$ mm long. A time/cure sweep was carried out under a desired force oscillation or testing frequency of about 1 Hz and an autostrain range of about $1.0\times10^{-5}\%$ to about 1%. The temperature range examined was about −60° to about 90° C. The preferred phase change ink compositions typically are (a) ductile or flexible at a temperature of about −10° to about 80° C., (b) have a temperature range for the glassy region from about −100° to 40° C., the value of E′ being from about $1.5 \times 10^9$ to $1.5 \times 10^{11}$ dynes/cm², (c) have a temperature range for the transition region from about −50° to about 60° C., (d) have a temperature range for the rubbery region of E′ from about −10° to 100° C., the value of E′ being from about $1.0 \times 10^6$ to about $1.0 \times 10^{11}$ dynes/cm², and (e) have a temperature range for the terminal region of E′ from about 30° to about 160° C. Furthermore, the glass transition temperature range of the phase change ink compositions are from about −40° to about 40° C., the temperature range for integrating under the tan δ peak of the phase change ink composition is from about −80° to about 80° C. with integration values ranging from about 5 to about 40, and the temperature range for the peak value of tan δ of the phase change ink is from about −40° to about 40° C. with a tan δ of about $1.0 \times 10^{-2}$ to about $1.0 \times 10$ at peak.

FIG. 1 shows a representative plot of the storage modulus, E′, as a function of temperature at about 1 Hz for an appropriate phase change ink composition for use in the printing process of the present invention. The curve will be divided up into four distinct regions: glassy, transition, rubbery, and terminal.

In the glassy region the ink behaves similar to a hard, brittle solid i.e., E′ is high, about $1 \times 10^{10}$ dynes/cm². This is because in this region there is not enough thermal energy or a long enough time for the molecules to move. This region needs to be well-below room temperature so the ink will not be brittle and affect the room temperature performance on paper.

The transition region is characterized by a large drop in the storage modulus of about one order of magnitude. This is because the molecules have enough thermal energy or time to undergo conformational changes. In this region, the ink changes from being hard and brittle to being tough and leathery.

The rubbery region describes a slightly decreasing plateau. In this region, there is a short term elastic response to the deformation that gives the ink its flexibility. It is theorized that the impedance to motion or flow in this region is due to entanglements of molecules or physical cross-links from crystalline domains. Fine tuning of the ink to get this plateau in the appropriate temperature range for good transfer and fixing and room temperature performance is of great importance in formulating these phase change ink compositions. The rubbery region encompasses the ink in both its malleable state during the transfer and fixing or fusing step and its final ductile state on the final receiving substrate.

Finally, in the terminal region, there is another drop in the modulus. It is believed in this region that the molecules have sufficient energy or time to flow and overcome the entanglements.

Figure 2:
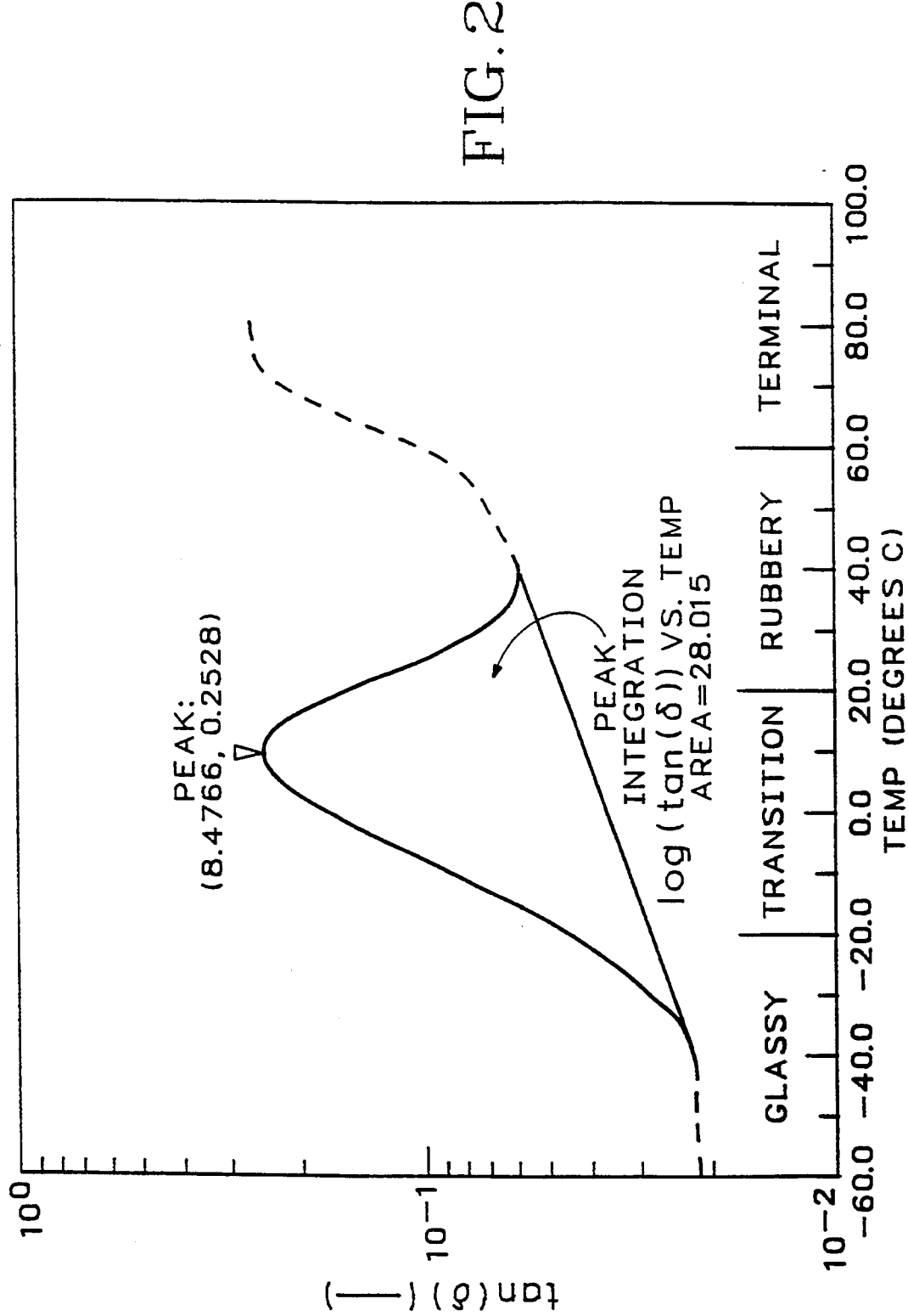
FIG. 2 is a generalized temperature profile of tan δ for a phase change ink composition of the present invention.

FIG. 2 gives the general temperature profile of tan δ for a phase change ink composition for use in the printing process of the present invention. In the glassy region, tan δ is small. The peak of the damping curve occurs in the transition region and indicates the $T_g$ of the material. The area under the tan δ curve gives an indication of the relative toughness of the ink, which is a measure of the energy dissipated during deformation. Since tan δ is equal to the loss modulus divided by the storage modulus, it is not necessary to specify the profiles of both the tan δ and loss modulus.

The phase change ink compositions were also analyzed by compressive yield testing. The compressive yield strength measurements were done on an MTS SINTECH 2/D mechanical tester manufactured by MTS Sintech, Inc. of Cary, N.C., using small cylindrical sample blocks. The dimensions of a typical sample are about $19.0 \pm 1.0$ mm × about $19.0 \pm 1.0$ mm. Isothermal yield stress was measured as a function of temperature (about 25° to about 80° C.) and strain rate. The material was deformed up to about 40%.

The preferred yield stresses as a function of temperature for suitable phase change ink compositions for use in the indirect printing process of the present invention are described by an equation as follows:

$$YS = mT + I$$

wherein YS, which is a function of temperature, is the yield stress, m is the slope, T is the temperature, and I is the intercept.

Under non-process conditions, i.e., after the final printed product is formed or conditions under which the ink sticks are stored, and the ink is in a ductile state or condition at a temperature range of from at least about 10° to about 60° C., the preferred yield stress values are described by m as being from about $-9 \pm -2$ psi/°C. to about $-36 \pm -2$ psi/°C. and I as being from about $800 \pm 100$ psi to about $2200 \pm 100$ psi. More preferably, m is about $-30 \pm -2$ psi/°C. and I is about $1700 \pm 100$ psi. Under process conditions, i.e., during the indirect printing of the ink from an intermediate transfer surface onto a substrate while the ink is in a malleable solid condition or state, at a temperature of from at least about 30° C. to about 80° C., the preferred stress values are described by m as being from about $-6 \pm -2$ psi/°C. to about $-36 \pm -2$ psi/°C. and I as being from about $800 \pm 100$ psi to about $1600 \pm 100$ psi. More preferably, m is about $-9 \pm -2$ psi/°C. and I is about $950 \pm 100$ psi.

Referring to FIG. 13, the ink utilized in the process and system 10 of the instant invention is preferably initially in solid form and is then changed to a molten state by the application of heat energy to raise the temperature from about 85° C. to about 150° C. Elevated temperatures above this range will cause degradation or chemical breakdown of the ink. The molten ink is then applied in raster fashion from the ink jets in the printhead 11 to the exposed surface of the liquid layer 12 forming the intermediate transfer surface, where it is cooled to an intermediate temperature and solidifies to a malleable state seen as ink drop 26 of FIG. 14. FIG. 15 shows the malleable ink 10 as it is transferred to the final receiving surface 28 via a contact transfer by entering the nip between the pressure and fusing roller 22 and the liquid layer 12 forming the intermediate transfer surface on the support surface or drum 14. This intermediate temperature where the solidified ink is maintained in its malleable state is between about 30° C. to about 80° C.

Once the solid malleable ink image enters the nip, as seen in FIG. 15, it is deformed to its final image conformation 29 and adheres or is fixed to the final receiving substrate 28 either by the pressure exerted against ink image on the final receiving substrate 28 by the pressure and fusing roller 22 alone, or by the combination of the pressure and heat supplied by appropriate heating apparatus 21 of FIG. 13. Additional heating apparatus 19 & 24 could optionally be employed to supply heat to facilitate the process at this point. The pressure exerted on the ink image is between about 10 to about 2000 pounds per square inch (psi), more preferably between about 500 to about 1000 psi, and most preferably between about 750 to about 850 psi. The pressure must be sufficient to have the ink image adhere to the final receiving substrate 28 and be sufficiently deformed to ensure that light is transmitted through the ink image rectilinearly or without significant deviation in its path from the inlet to the outlet, in those instances when the final receiving substrate is a transparency. Once adhered to the final receiving substrate, the ink image is cooled to ambient temperature of about 20° to about 25° C. The ink comprising the ink image must be ductile, or be able to yield or experience plastic deformation without fracture when kept above the glass transition temperature. Below the glass transition temperature the ink is brittle. The temperature of the ink image in the ductile state is between about −10° C. and to about the melting point, or less than about 85° C.

The following examples are presented to illustrate the scope of the invention and to be illustrative of the phase change ink formulations that can be successfully employed both with and without a liquid intermediate transfer surface, without any intent to limit the invention to the specific materials, process or structure employed.

EXAMPLE 1

This example demonstrates that even though a phase change ink composition can be effectively applied to an underlying substrate by direct ink jet printing techniques, such as described in Example 1 of U.S. Pat. No. 4,889,560, that same phase change ink composition may not be effectively applied by the indirect ink jet printing techniques of the present invention.

Solid phase change ink ingots of the subtractive primary colors were produced as follows: The phase change ink carrier composition was prepared from 58 grams of KENAMIDE S180, 32 grams of UNIREZ X37-51-15 (a dimer acid-based tetraamide material manufactured by Union Camp and formed by the reaction of one mole of dimer acid, two moles of ethylene diamine, and two moles of stearic acid), and 10 grams of KE-311 Resin which were added to a 500 ml. beaker and heated with stirring to a temperature of about 120° C. After a homogeneous solution of the materials was achieved, the molten phase change ink carrier composition was filtered through a heated Mott apparatus using Whatman #3 filter paper and a pressure of 15 psi. The molten phase change ink carrier was placed in a beaker at about 105° C. 1% by weight of ORASOL YELLOW 46N colorant from Ciba Geigy was added to the mixture, which was then stirred at about 105° C. for about 1 hour. The resulting ink composition was filtered using Whatman #3 filter paper in the heated Mott apparatus at about 110° C. The filtrate was poured into molds and allowed to solidify to form solid ink sticks.

The above procedure was repeated, substituting the other primary colorants required for ink jet color printing as follows: about 0.63% by weight NEOLANE RED T-X8 400 FA by Ciba Geigy and about 0.24% by weight PRIMENE 81R by Rohm & Haas to produce magenta solid ink sticks; about 1.1% by weight SAVINYL BLUE 6 LS by Sandoz and about 1.6% by weight SAVINYL BLACK & RLS to produce cyan solid ink sticks.

The inks are placed in a phase change color printer and applied from an ink jet printhead heated to about 140° C. to a liquid intermediate transfer surface supported by about a 4.13 inch diameter support drum. The raster printed image is contact transferred in a pagewise fashion to a sheet of Hammermill Laser Print high resolution electronic publishing grade paper by pressure in a nip formed between a fusing roller and the support drum while being maintained at a temperature of about 50° C. The image is not fully transferred and is weak and crumbly. The image cracks upon folding of the paper at room temperature.

Figure 3:
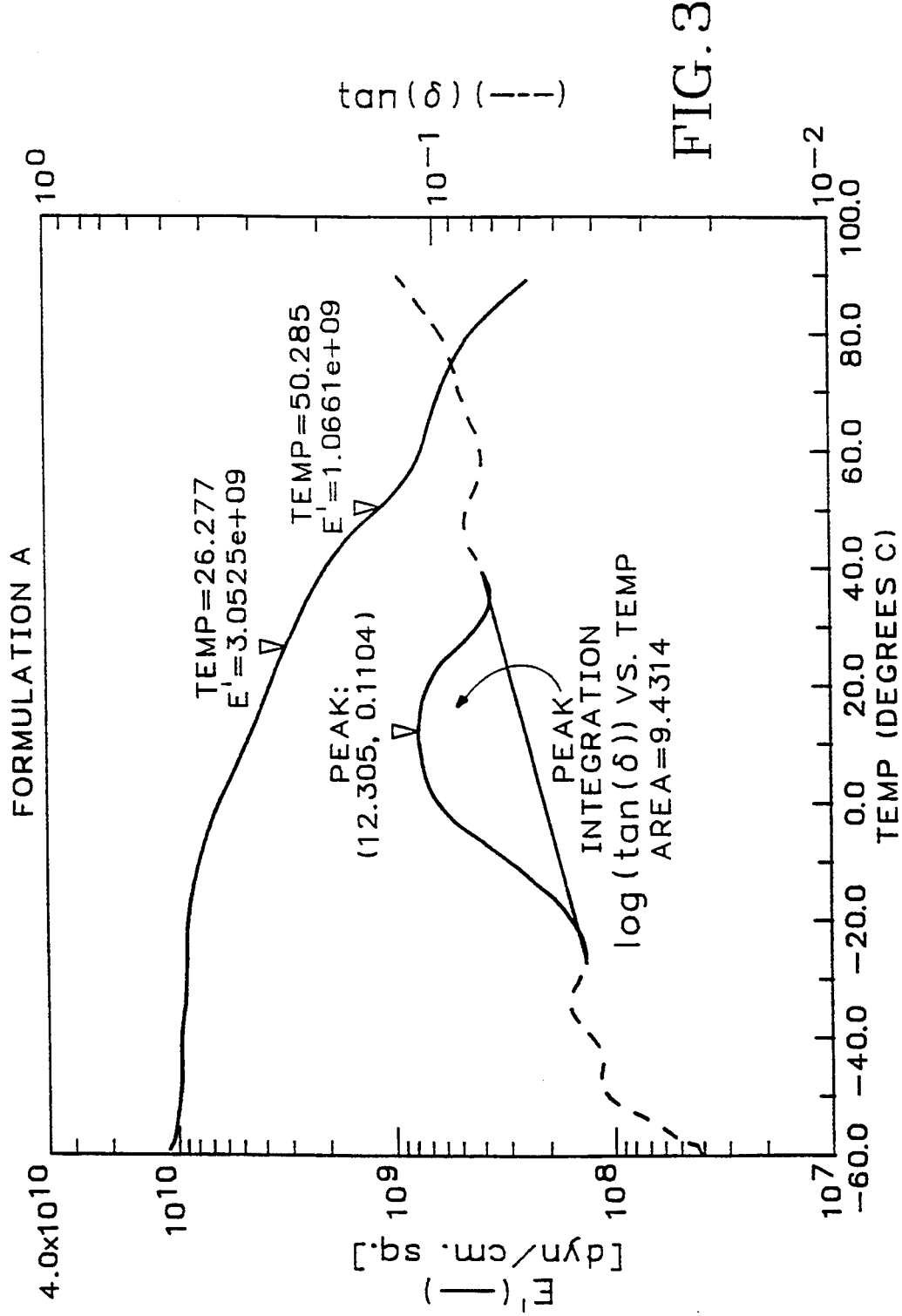
FIG. 3 is a DMA curve for the formulation of Example 1.

It is clear that the DMA curve shown in FIG. 3 for the phase change ink composition described above does not have a distinct rubbery plateau associated with an amorphous material. This indicates that this phase change ink composition has a high percent crystallinity and requires more stress to yield the ink during the transfer and fusing process. The area under the tan δ peak, i.e., 9.4, is small, indicating that the ink is not very tough.

Figure 9:
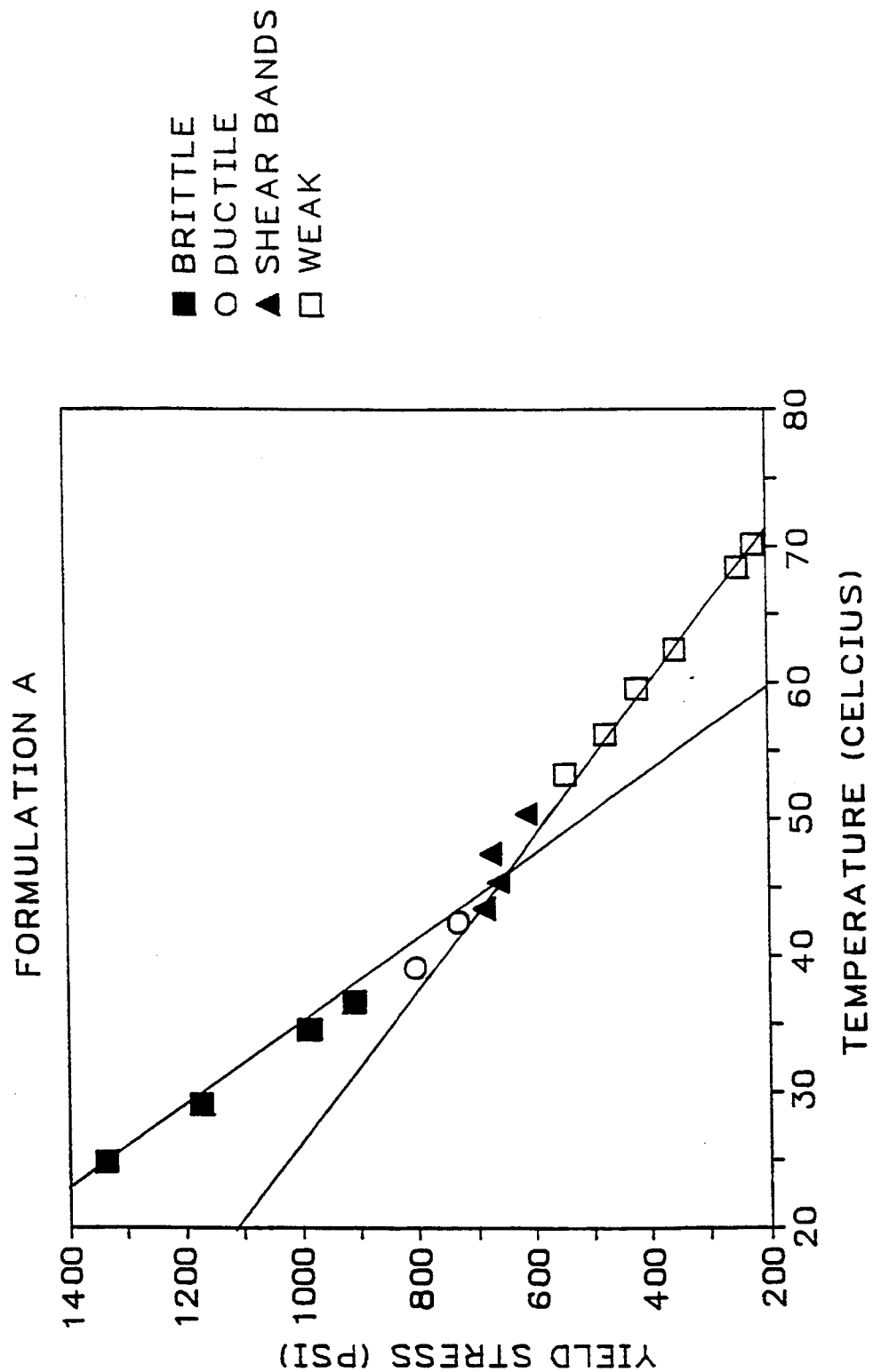
FIGS. 9, 10 and 12 are plots of compressive yield strength versus temperature for the formulations of Examples 1 and 2.

FIG. 9 is a plot of the yield stress as a function of temperature at a constant strain rate of approximately 0.7 sec$^{-1}$ for Formulation A. From room temperature up to about 35° C., the ink composition is brittle in compression. This indicates that it would not be very flexible or ductile and would tend to crack upon folding of the final receiving substrate. From about 35° C. to about 40° C., the composition is ductile. This is too narrow of a range for efficient use in the indirect printing process. In the about 40° to about 50° C. range, the ink starts to show signs of shear banding. The mechanical properties of the ink start to deteriorate beyond about 50° C., which is characterized by a weak, crumbly behavior of the ink. This is highly undesirable in the indirect printing process using an intermediate transfer surface since the ink, once fused under these conditions, does not have the cohesive strength for efficient transfer. The yield stresses for this formulation are extremely high. This is undesirable because relatively high pressure is needed to fuse the ink during transfer.

EXAMPLE 2

This example demonstrates a formulation identified as Formulation B, which meets the flexibility and toughness standards not achieved by the phase change ink composition of Example 1 of U.S. Pat. No. 4,889,560. The formulation illustrates a hot melt ink that is flexible at room temperature and can be transferred and fixed to a final receiving substrate up to about 50° C. The ink was formulated according to the procedure followed in Example I, using the following ingredients:

| Ingredients | Weight % |
| --- | --- |
| KEMAMIDE S-180 | 41.5 |
| Tetra-amide | 21.5 |
| KE-311 | 27.5 |
| SANTICIZER-278 | 9.5 |

Figure 4:
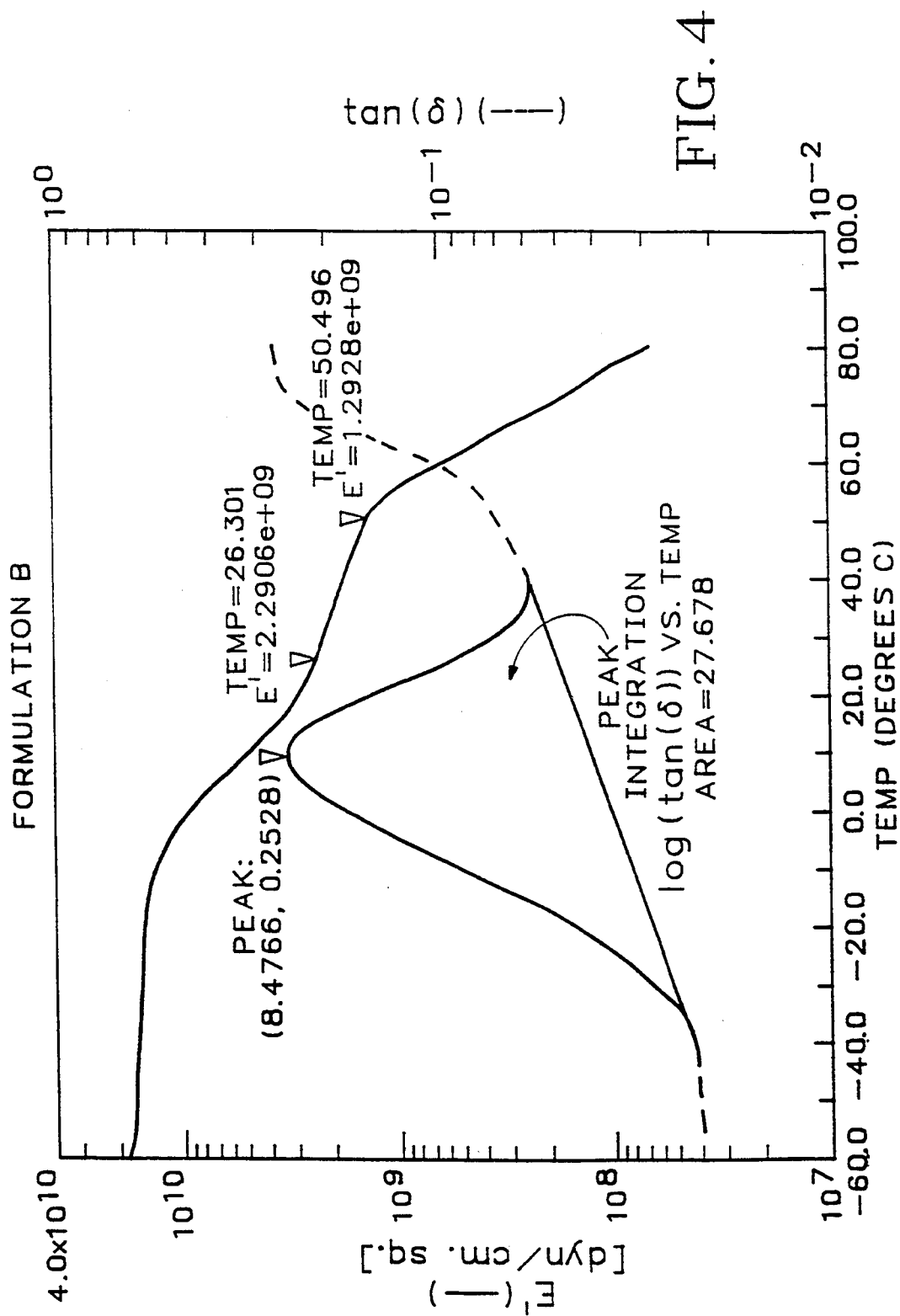

The dyes were added to the ink carrier composition of this Example following the procedure in Example 1 in the following amounts:
  about 2.00% by weight OROSOL YELLOW 46N
  about 1.26% by weight NEOLANE RED E-XB 400FA about 0.48% by weight PRIMENE 81R
about 2.20% by weight SAVINYL BLUE GLS
about 3.2% by weight SAVINYL BLACK RLS The DMA curve for Formulation B is given in FIG. 4. The $T_g$ of the ink is about 8.5° C., so it should be flexible at room temperature. There is a distinct drop in E' of about one order in magnitude at the $T_g$. This indicated that the ink is not highly crystalline. The modulus is lower than that of Formulation A in Example 1, indicating that less energy is needed to yield and spread the ink during the transfer and fixing steps, as is evidenced by the compression testing results given below. There is a short rubbery plateau from room temperature to about 50° C. At temperatures higher than about 50° C., there is a distinct reduction in modulus, indicating a loss in mechanical strength so transfer and fixing is not feasible beyond this temperature. The area under the tan δ peak is 27.7, which is about three times higher than Formulation A in Example 1 and indicates that the ink will be much tougher.

Figure 10:
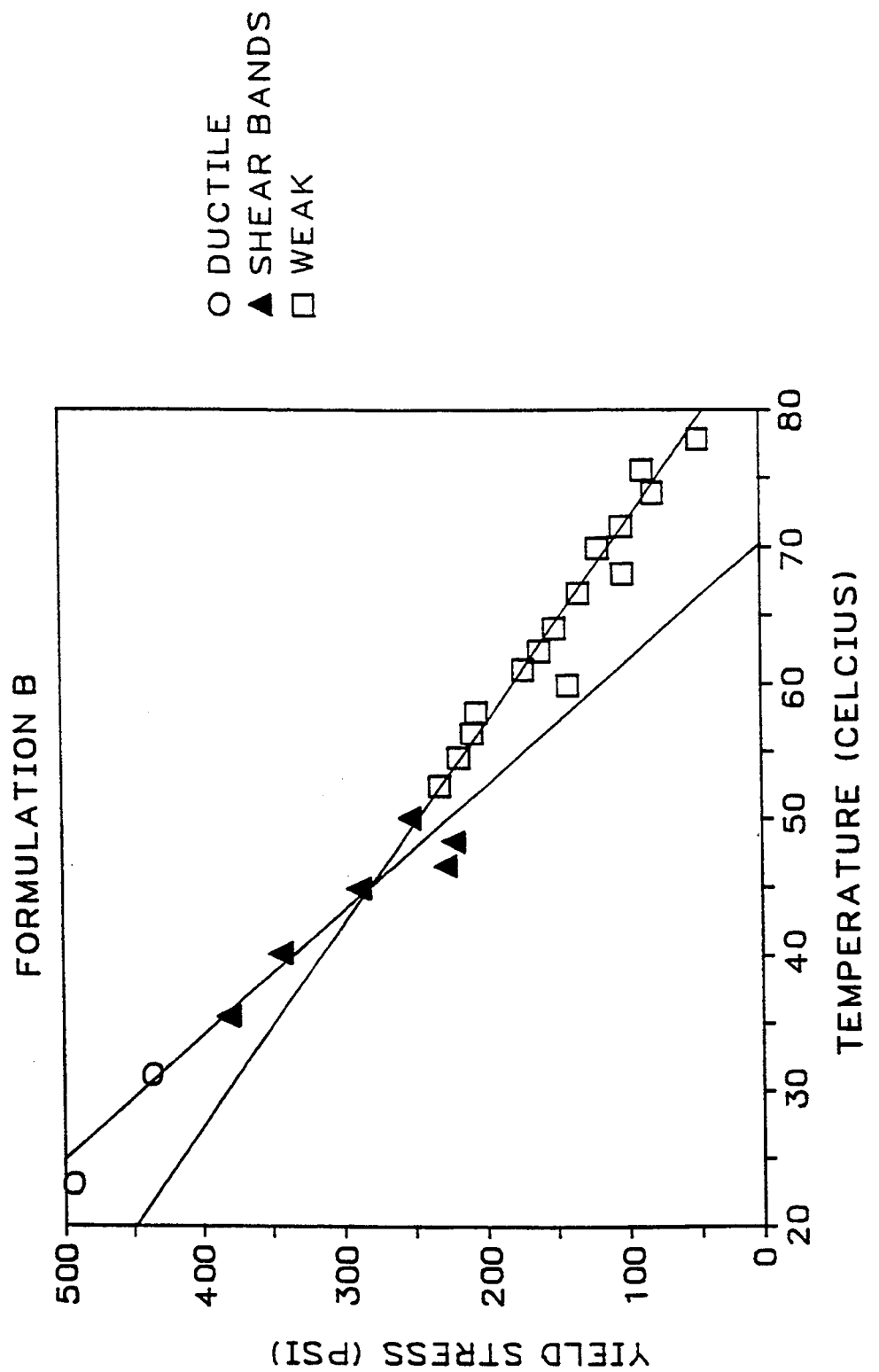

FIG. 10 is a plot of the yield stress as a function of temperature at a constant strain rate of approximately 0.7 sec$^{-1}$ for Formulation B. From room temperature up to about 35° C., Formulation B is ductile. This indicates that this composition is flexible at room temperature, and when printed on paper and transparency substrates it does not crack upon their being folded. The shear bandings occur in the range of about 35° to about 50° C. and the ink becomes weak and crumbly beyond about 50° C. The yield stress for this formulation is lower than Formulation A, which is desirable for the indirect printing process.

Figure 11:
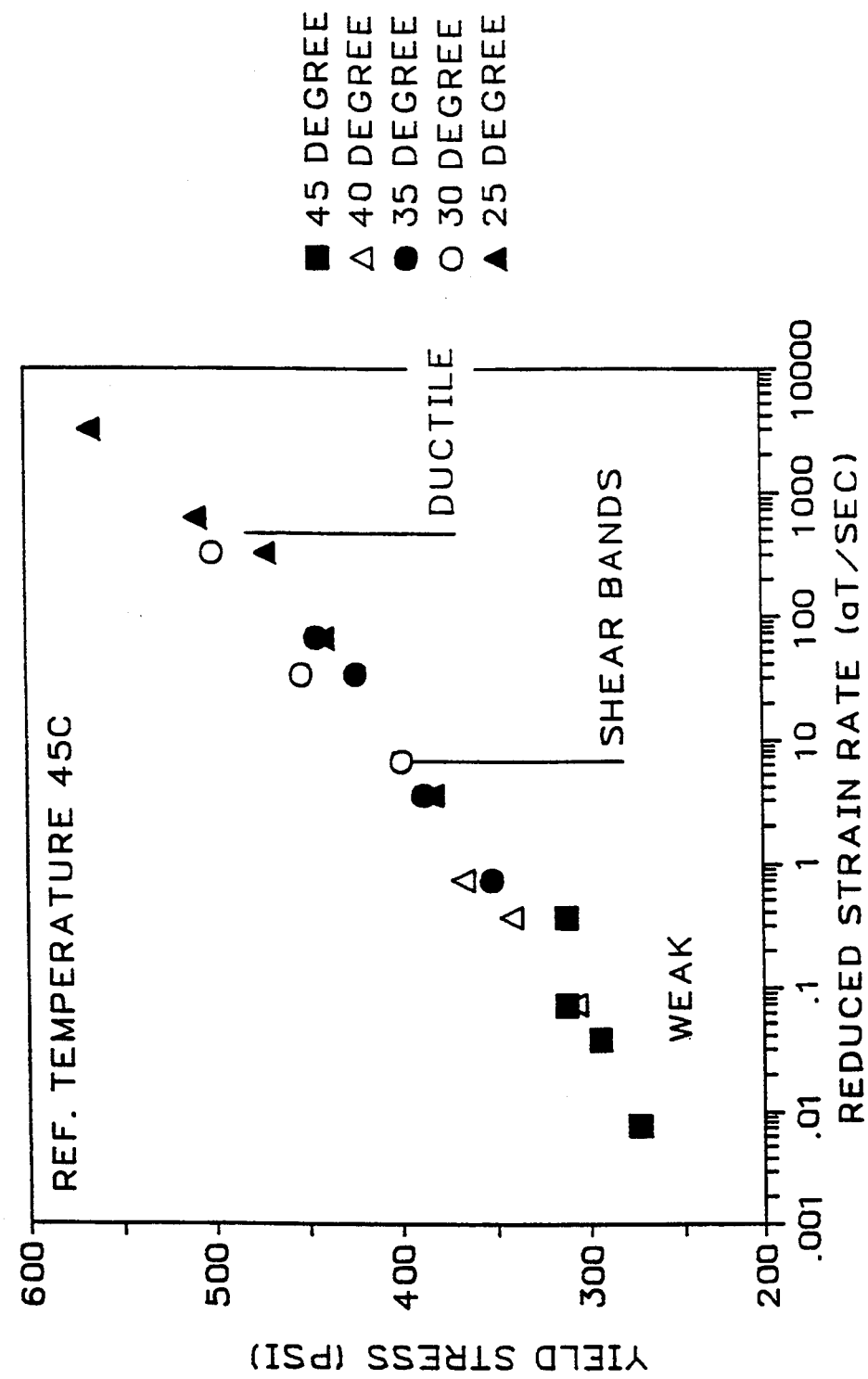
FIG. 11 is a plot of the compressive yield strength versus strain rate for the formulation B of Example 2.

FIG. 11 is a plot of yield stress as a function of reduced strain rate for the referenced temperature of about 45° C. for Formulation B. At low strain rate, below 10 sec$^{-1}$, the composition is weak and crumbly. As the strain rate increases, the ink molecules have less chance to flow past each other and are able to retain cohesive strength. The reduced data indicates that for every decade in rate there is a gain of at least about 5° C. for each transition. Since these compressive yield tests were carried out at least 2 orders of magnitude lower in rate than the rate used during the indirect printing process with a liquid intermediate transfer surface, the ink is in the safe ductile-shear banding zone instead of the shear banding-weak zone during the transfer and fixing process of the indirect printing process.

The inks were placed in a phase change color printer, heated to about 140° C., and applied from an ink jet printhead to a liquid intermediate transfer surface supported by about a 4.13 inch diameter support drum. The raster printed image was contact transferred in a pagewise fashion to a sheet of Xerox 4024 plain paper by pressure in a nip formed between a fusing roller and the support drum while being maintained at a temperature of about 50° C. The image was fully transferred and was well fused into a uniform layer with no indication of cohesive failure upon microscopic inspection. The image revealed no evidence of cracking upon folding of the paper at room temperature.

EXAMPLE 3

Formulation F represents the formulation that has the best blocking characteristics of the inks tested and which is flexible at room temperature under normal slow folding rates, is ductile and retains its cohesive strength under high transfer and fixing temperatures and rates, possesses low yield stress at the transfer and fixing range of between about 40° and about 70° C., and has high yield stresses at room temperatures for good durability.

The ink was formulated according to the procedure followed in Example 1, using the following ingredients:

| Ingredients | Weight % |
| --- | --- |
| KEMAMIDE S-180 | 47.0 |
| Tetra-amide | 21.5 |
| KE-311 | 27.0 |
| SANTICIZER-278 | 4.5 |

The dyes were added to the ink carrier composition in the same quantity as given in Example 2 following the procedure of Example 1.

The resulting inks were placed in a phase change color printer and run according to the description in Example 2.

Figure 12:
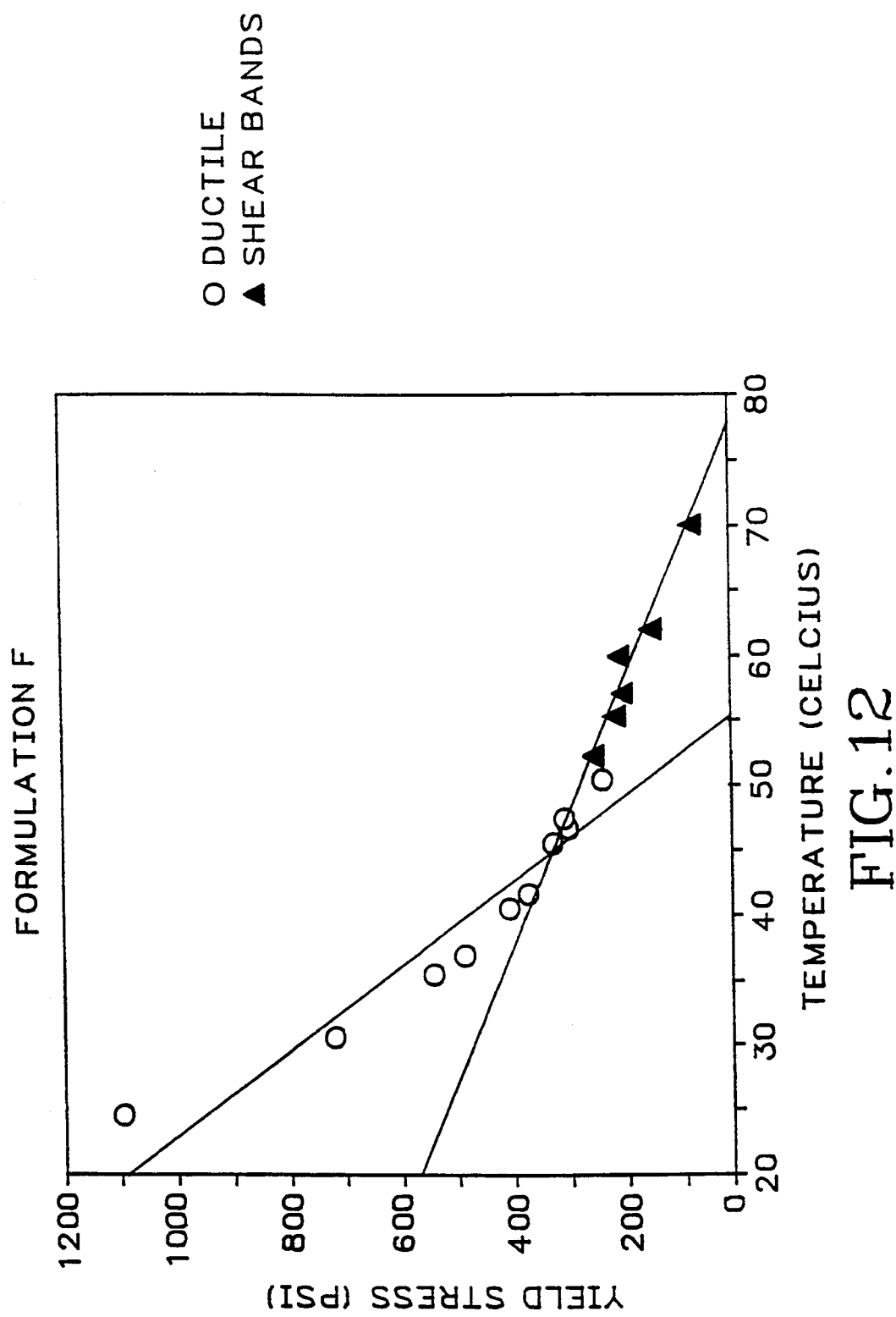

FIG. 12 is a plot of yield stress as a function of temperature for Formulation F. The composition is ductile from at least about 25° C. to about 55° C. The yield stresses in this range approach the high values of Formulation A. Hence, the composition should have far better blocking properties and durability than Formulation B. From about 55° C. to about 70° C., the ink starts to form shear bands, but still retains cohesive strength. The yield stresses in this range are approximately the same as Formulation B. Therefore, high pressure is not needed to fuse this ink during the indirect printing process using an intermediate transfer surface.

Figure 8:
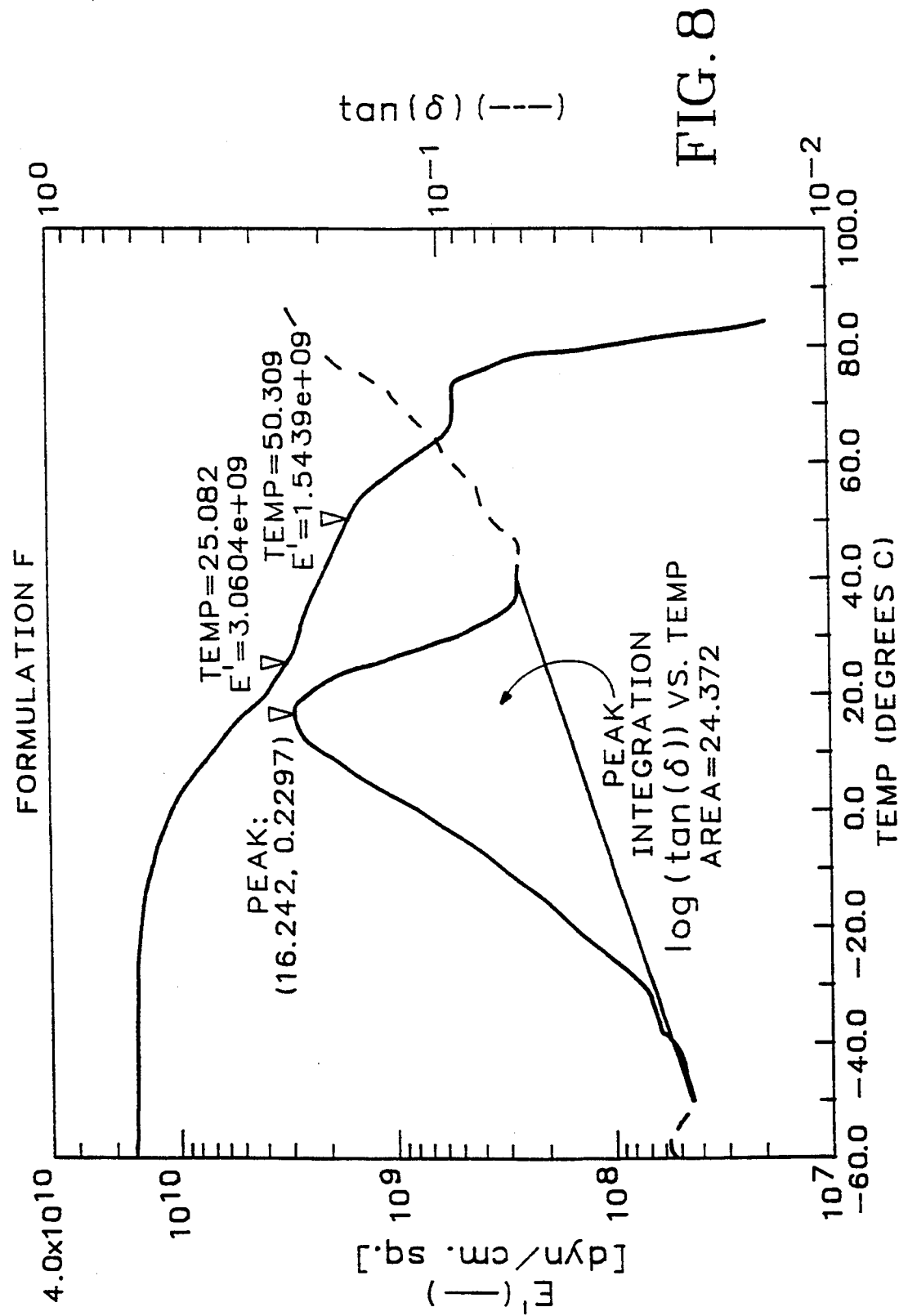

The DMA curve for Formulation F is given in FIG. 8. The $T_g$ of the ink is about 16° C., so it is still flexible or ductile at room temperature. There is a distinct drop in E' of about one order in magnitude at the $T_g$. This indicates that the ink is not highly crystalline. The modulus is lower than that of Formula A, indicating that less energy is needed to yield and spread the ink during the transfer and fixing process. There is a short rubbery plateau from room temperature to about 55° C. At temperatures higher than about 55° C., the reduction in modulus is not as abrupt as that for Formulation B in Example 2, indicating there is still some mechanical strength up to about 70° C. The area under the tan δ peak is about 24, which is only slightly lower than Formula B, and will result in an ink with similar toughness.

EXAMPLE 4

Formulation C illustrates a hot melt ink with the rubbery plateau extended to about 70° C. and still retains most of the same properties as Formulation B in Example 2. The ink was formulated according to the ingredients for the dyes in Example 2 and according to the procedure followed in Example 1, using the following ingredients:

| Ingredients | Weight % |
| --- | --- |
| KEMAMIDE S-180 | 50 |
| Tetra-amide | 30 |
| CELLOLYN-21 | 20 |

Figure 5:
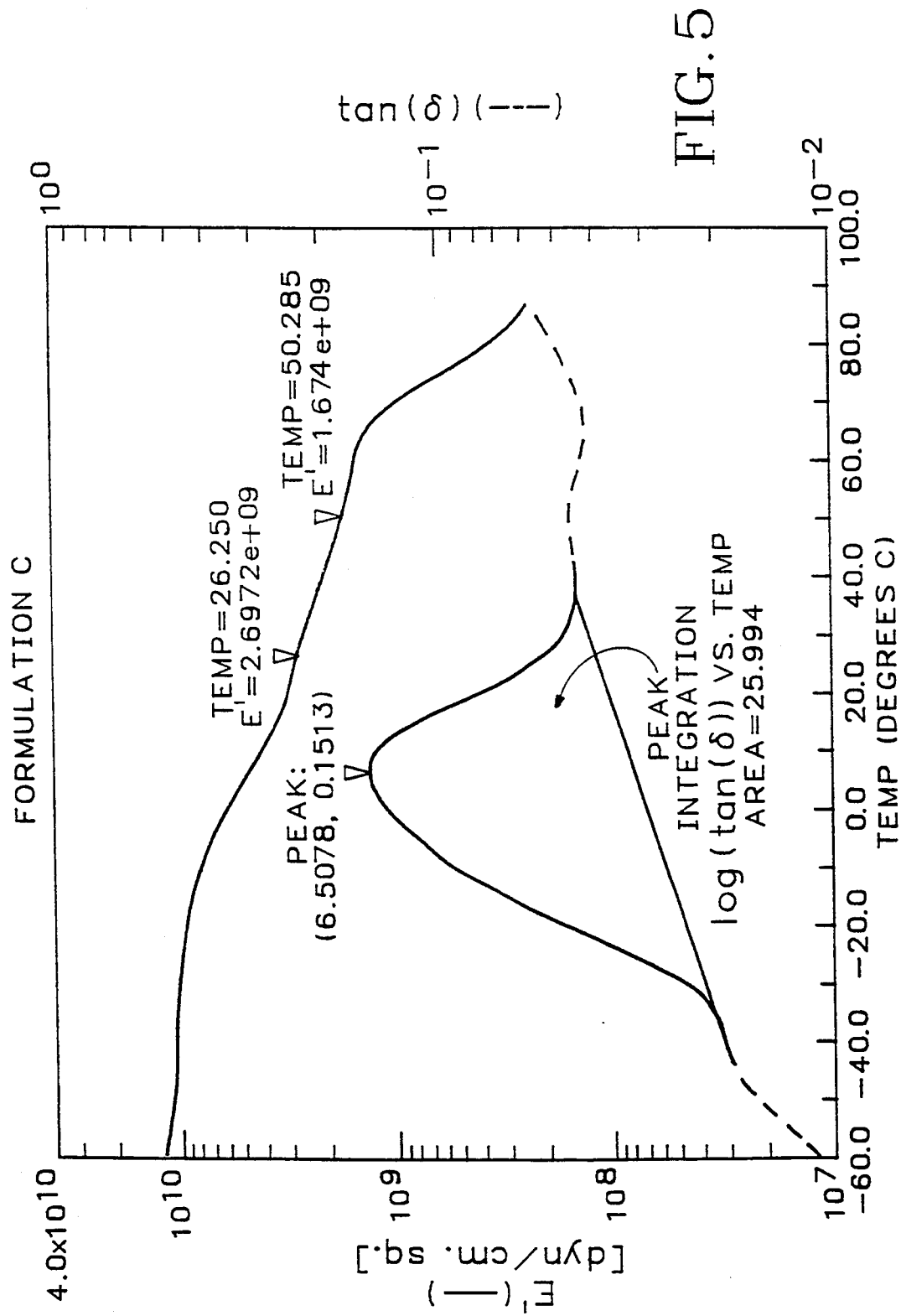
FIGS. 5, 6, 7 and 8 are DMA curves for the formulations of Example 2.

The DMA curve for Formulation C is given in FIG. 5. The DMA data show that the $T_g$ is slightly lower than that for Formulation B, the modulus is slightly higher than Formulation B in Example 2, the rubbery plateau has been extended to about 70° C., and the area under the tan δ is slightly lower. The room temperature performance of the ink should be similar to Formulation A of Example 1. The temperature limit for cohesive failure of the ink is slightly lower than that for Formulation B in Example 2.

The four colors (cyan, magenta, yellow and black) of the ink were placed in a phase change color printer and run according to the description in Example 2, except that the transfer and fixing temperature range was about 2° C. to about 5° C. higher. The quality of the printed image was comparable to that of Formulation B in Example 2.

EXAMPLE 5

Formulation D illustrates a hot melt ink with a higher $T_g$, but still has the same extension of the rubbery plateau as Formulation C in Example 4. The ink carrier composition was formulated according to the procedure followed in Example 1, using the following ingredients:

| Ingredients | Weight % |
| --- | --- |
| KEMAMIDE S-180 | 49.0 |
| Tetra-amide | 21.5 |
| KE-311 | 27.0 |
| SANTICIZER-278 | 2.5 |

Figure 6:
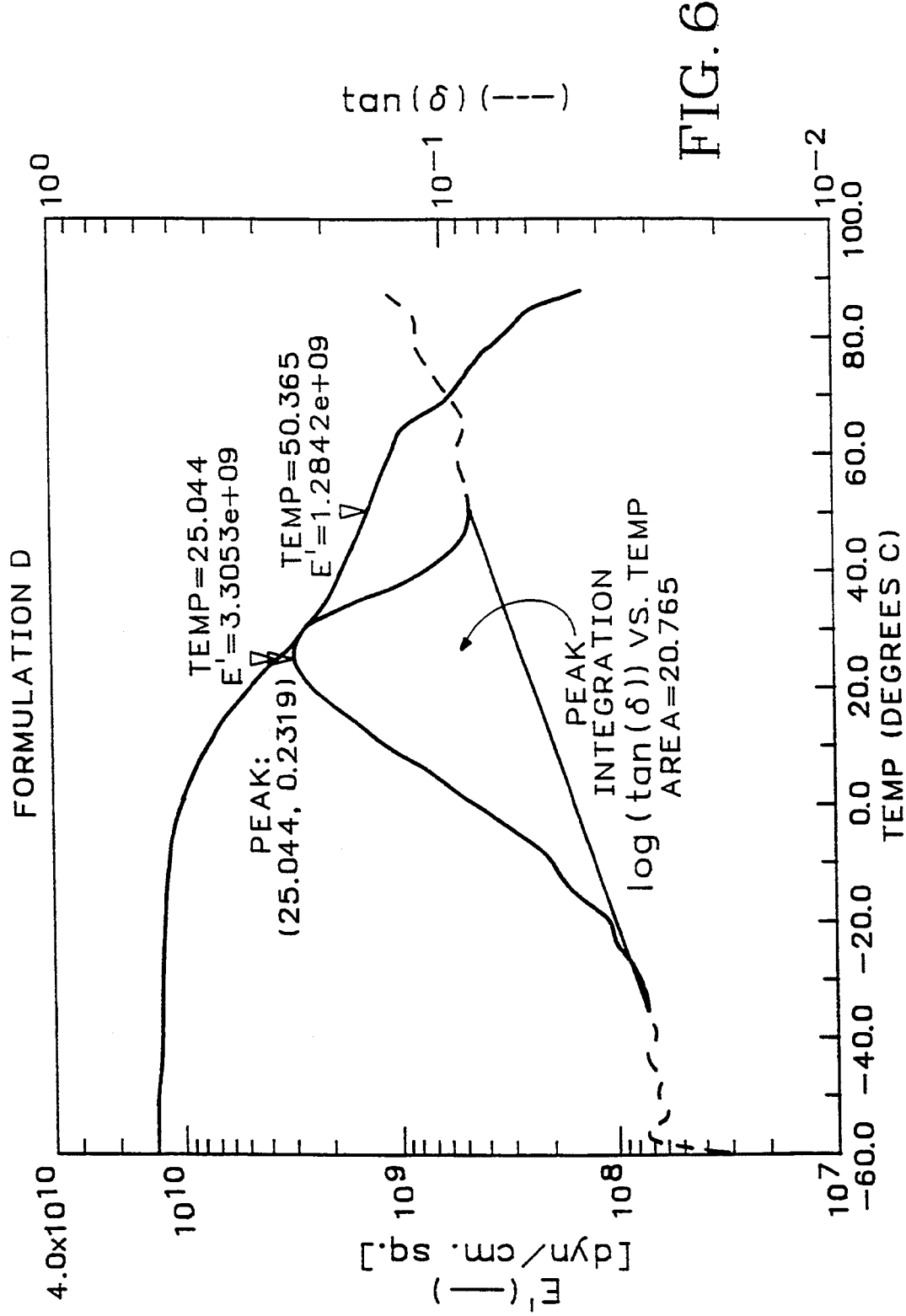

The DMA curve for Formula D is given in FIG. 6. The DMA data show that the $T_g$ is higher than that for Formula C of Example 4 by about 19° C., the extension on the rubbery plateau is still the same, and the area under tan δ is lightly lower. The room temperature performance of this ink is less flexible, but more energy dissipative and therefore tougher because the tan δ peaks at about room temperature.

EXAMPLE 6

Formulation E illustrates a hot melt ink with an extremely low $T_g$. The ink carrier composition was formulated according to the procedure followed in Example 1, using the following ingredients:

| Ingredients | Weight % |
| --- | --- |
| KEMAMIDE S-180 | 31.0 |
| Tetra-amide | 21.5 |
| KE-311 | 27.5 |
| SANTICIZER-278 | 20.0 |

Figure 7:
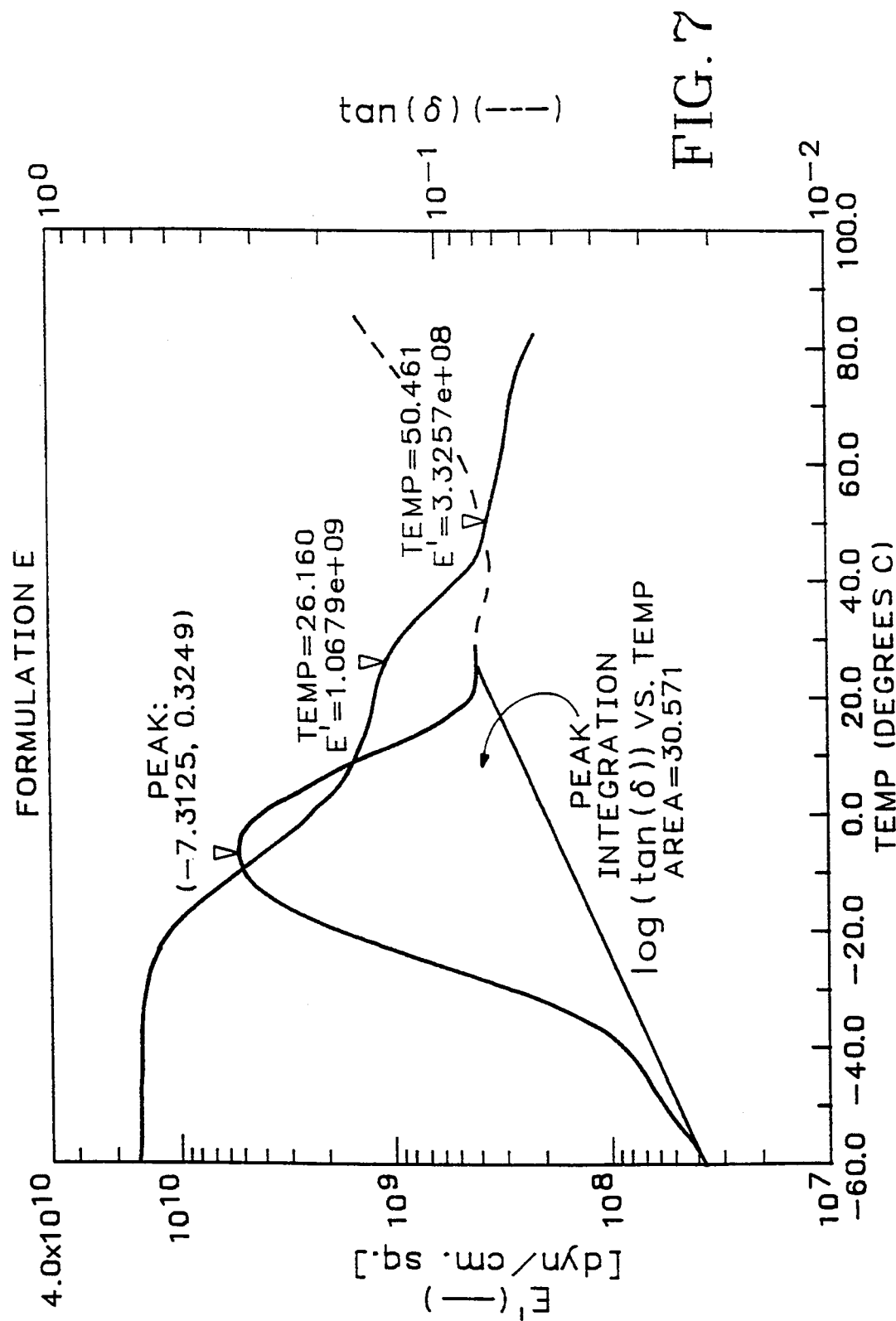

The DMA curve for Formulation E is given in FIG. 7. The $T_g$ of the formulation is about $-7.3°$ C., which is well below room temperature. The ink is very flexible at room temperature. The ink is the toughest of all of the formulations, which is obvious from the high value of the area under the tan δ peak. The profile of the modulus curve shows two distinct transitions, giving one plateau for room temperature performance and another at a lower modulus for easier transfer and fixing.

EXAMPLE 7

This example demonstrates the high chroma ($C^*_{ab}$) and lightness ($L^*$) values of the phase change ink compositions of the present invention.

The reflectance spectra test data for the primary and secondary colors are listed in Tables 1-2 below for the formulations used in Examples 2 and 3. (Measurement conditions were: Illuminate C, 2 degree observer, small area view, specular included, wavelength interval 230 nm.)

TABLE 1

| | (Formulation B) | | | | | | | | |
| --- | --- | --- | --- | --- | --- | --- | --- | --- | --- |
| Color | L* | A* | B* | DL* | Da* | Db* | DC*ab | Hab | C*ab |
| Black | 22.98 | 2.36 | −2.78 | −71.21 | 1.54 | −1.20 | 1.87 | 310.34 | 3.65 |
| Cyan | 56.95 | −26.61 | −39.88 | −37.25 | −27.44 | −38.30 | 46.16 | 236.29 | 47.95 |
| Magenta | 60.42 | 78.30 | −29.60 | −33.78 | 77.47 | −28.07 | 81.92 | 339.29 | 83.71 |
| Yellow | 89.43 | −13.62 | 87.02 | −4.77 | −14.44 | 88.60 | 86.30 | 99.89 | 88.08 |
| Green | 56.68 | −48.21 | 22.63 | −37.52 | −49.03 | 24.41 | 51.56 | 154.66 | 53.34 |
| Red | 58.31 | 54.80 | 37.57 | −35.89 | 53.98 | 39.15 | 64.66 | 34.43 | 66.44 |
| Blue | 37.62 | 35.07 | −53.99 | −56.58 | 34.25 | −52.41 | 62.60 | 303.01 | 64.38 |
| Hammermill Paper Background) | 94.20 | 0.83 | −1.58 | .— | .— | .— | .— | 297.57 | 1.78 |

TABLE 2

| | (Formulation F) | | | | | | | | |
| --- | --- | --- | --- | --- | --- | --- | --- | --- | --- |
| Color | L* | A* | B* | DL* | Da* | Db* | DC*ab | Hab | C*ab |
| Black | 23.45 | 2.34 | −3.24 | −71.18 | 1.53 | −1.26 | 1.86 | 305.81 | 4.00 |
| Cyan | 56.76 | −26.11 | −41.40 | −37.86 | −26.91 | −39.42 | 46.80 | 237.77 | 48.94 |
| Magenta | 48.79 | 83.05 | −35.14 | −45.84 | 82.24 | −33.16 | 88.04 | 337.07 | 90.18 |
| Yellow | 90.57 | −17.23 | 90.54 | −4.06 | −18.03 | 92.53 | 90.02 | 100.77 | 92.17 |
| Red | 49.88 | −56.01 | 32.45 | −44.75 | −55.20 | 34.44 | 62.59 | 30.09 | 64.73 |
| Green | 55.09 | 56.24 | 25.48 | −39.54 | 57.04 | 27.46 | 59.60 | 155.62 | 61.74 |
| Blue | 30.65 | 39.98 | −56.00 | −63.98 | 39.17 | −54.02 | 66.66 | 305.52 | 68.81 |
| Hammer—mill Paper Background) | 94.63 | 0.81 | −1.98 | .— | .— | .— | .— | 292.16 | 2.14 |

Having illustrated and described the principles of our invention in a preferred embodiment thereof, it should be readily apparent to those skilled in the art that the invention can be modified in arrangement and detail without departing from such principles. For example, the ink carrier composition employed with the colorant to form the ink composition of the present invention can be a low viscosity semicrystalline or crystalline amide wax, an ester wax, a polyethylene wax, a microcrystalline wax or a paraffin in combination with a hydrocarbon or resin based amorphous material, or an oligomer, or low molecular weight polymer or copolymer, or a tackifier, or a plasticizer and combinations thereof. We claim all modifications coming within the spirit and scope of the accompanying claims.

We claim:

1. A process for indirectly applying a phase change ink composition to a substrate, which comprises
   a. combining a phase change ink colorant composition and a modified phase change ink carder composition to produce said phase change ink composition having fluidic and mechanical properties which meet the parameters needed for indirect application thereof;
   b. raising the temperature of said phase change ink composition to a first operating temperature to form a liquid phase change ink composition;
   c. providing a liquid intermediate transfer means at a second operating temperature for indirectly applying said phase change ink composition to said substrate;
   d. applying droplets of said phase change ink composition to said liquid intermediate transfer means in a pattern and in a liquid phase;
   e. forming said pattern of said phase change ink composition in a solid phase on said liquid intermediate transfer means at the second operating temperature;
   f. transferring said phase change ink composition from said liquid intermediate transfer means to said substrate; and
   g. fixing said phase change ink composition to said substrate to form a printed substrate, said phase change ink composition having (1) a compressive yield strength which will allow it to be malleable to spread and deform without an increase in stress when compressive forces are applied thereto at the second operating temperature, and sufficient internal cohesive strength to avoid shear banding and weak behavior when said phase change ink composition is transferred and fixed to said substrate, and (2) a ductility on said substrate after said fixing.

2. The process of claim 1, wherein said phase change ink composition has a first operating temperature of at least about 120 degrees C. and a viscosity of not more than about 30 centipoise.

3. The process of claim 1, wherein the temperature during the fixing of said phase change ink composition to said substrate is from about 40 to about 80 degrees C.

4. The process of claim 1, wherein said phase change ink composition is ductile at a temperature of about 10 to about 30 degrees C.

5. The process of claim 1, wherein the phase change ink composition has a temperature range for the glassy region of E′ from about −100 to about 40 degrees C., the value of E′ being from about $1.5 \times 10^9$ to about $1.5 \times 10^{11}$ dynes/cm$^2$ at about a 1 Hz testing frequency.

6. The process of claim 1, wherein the phase change ink composition has a temperature range for the transition region of E′ from about −50 to about 60 degrees C.

7. The process of claim 1, wherein the phase change ink composition has a temperature range for the rubbery region of E′ from about −10 to about 100 degrees C., the value of E′ being from about $1.0 \times 10^6$ to about $1.0 \times 10^{11}$ dynes/cm$^2$ at about a 1 Hz testing frequency.

8. The process of claim 1, wherein the phase change ink composition has a temperature range for the terminal region of E′ from about 30 to about 160 degrees C.

9. The process of claim 1, wherein the L* value of a substantially uniform film of about 10 micron thickness of a black color of a phase change ink composition produced from said phase change ink composition is not more than about 35.

10. The process of claim 1, wherein the films of uniform thickness of said phase change ink composition are rectilinearly light transmissive.

11. The process of claim 1, wherein the $C^*_{ab}$ value, of a substantially uniform thin film of about 10 micron thickness of a subtractive primary yellow color phase change ink composition produced from said phase change ink composition is at least about 40, of a subtractive primary magenta color phase change ink composition produced from said phase change ink composition is at least about 65, of a subtractive primary cyan color modified phase change ink composition produced from said colorant composition is at least about 30.

12. The process of claim 1, wherein the glass transition temperature range of the phase change ink composition is from about −40 to about 40 degrees C.

13. The process of claim 1, wherein the temperature range for the area under the tan δ peak of the phase change ink composition is from about −80 to about 80 degrees C. with an integration area range from about 5 to about 40.

14. The process of claim 1, wherein the L* value of a substantially uniform film of about 20 micron thickness of said phase change ink composition, is at least about 65.

15. The process of claim 1, wherein the temperature range for the peak value of tan δ of the phase change ink is from about −40 to about 40 degrees C. with a tan δ of from about $1.0 \times 10^{-2}$ to about $1.0 \times 10$ at peak.

16. The process of claim 1, wherein under non-process conditions, prior to raising the temperature of said phase change ink composition to a first operating temperature or subsequent to forming a printed substrate, the yield stress value (YS) of said phase change ink, according to the equation YS=mT+I, comprises a value as defined by a slope of a yield stress and temperature curve (m) which is from about $-9\pm-2$ psi/degrees C. to about $-36\pm-2$ psi/degrees C.; temperature (T) which is from about 10 to 60 degrees C.; and intercept of yield stress axis (I) which is from about $800\pm100$ psi to $2200\pm100$ psi.

17. The process of claim 16, wherein m is about $-30 \pm-2$ psi/degrees C and I is about $1700\pm100$ psi.

18. The process of claim 1, wherein under process conditions, from raising the temperature of said selective phase change ink composition to a first elevated operating temperature to forming a printed substrate, the yield stress value (YS), according to the equation YS=mT+I, comprises a value as defined by m which is from about $-6\pm-2$ psi/degrees C. to about $-36\pm-2$ psi/degrees C.; T is from about 40 to about 80 degrees C.; and I is from about $800\pm100$ psi to about $1600\pm100$ psi.

19. The process of claim 18, wherein m is about $-9\pm-2$ psi/degrees C. and I is about $950\pm100$ psi.

20. A process for using a phase change ink composition, which comprises
   a. combining a phase change ink colorant composition and a modified phase change ink career composition to produce said phase change ink composition having fluidic and mechanical properties which meet the parameters needed for indirect application thereof;

b. raising the temperature of said phase change ink composition to a first operating temperature to form a liquid phase change ink composition;

c. providing a liquid intermediate transfer means at a second operating temperature less than the first operating temperature for receiving said phase change ink composition in a liquid phase;

d. applying droplets of said phase change ink composition in a liquid phase to said liquid intermediate transfer means in a pattern;

e. cooling said pattern of said phase change ink composition to a malleable solid phase on said liquid intermediate transfer means to a temperature less than the second operating temperature;

f. transferring said pattern of said malleable solid phase change ink composition from said liquid intermediate transfer means to a receiving substrate;

g. fixing the pattern of said malleable solid phase change ink composition to said substrate to form a printed substrate, said phase change ink composition having a compressive yield strength which will allow it to be malleable to spread and deform without an increase in stress when compressive forces are applied thereto and sufficient internal cohesive strength to avoid shear banding and weak behavior when said phase change ink composition is transferred and fixed to said substrate; and h. cooling the pattern of said malleable solid phase change ink composition to ambient temperature such that it possesses a ductility on said substrate after said fixing.

21. The process of claim 20, wherein said phase change ink composition has an elevated operating temperature of at least about 120 degrees C. and a viscosity of not more than about 30 centipoise.

22. The process of claim 20, wherein the temperature during the fixing of said phase change ink composition to said substrate is from about 40 to about 80 degrees C.

23. The process of claim 20, wherein said phase change ink composition is ductile at a temperature of about 10 to about 30 degrees C.

24. The process of claim 20, wherein the phase change ink composition has a temperature range for the glassy region of E' from about −100 to about 40 degrees C., the value of E' being from about $1.5 \times 10^9$ to about $1.5 \times 10^{11}$ dynes/cm$^2$.

25. The process of claim 20, wherein the phase change ink composition has a temperature range for the transition region of E' from about −50 to about 60 degrees C.

26. The process of claim 20, wherein the phase change ink composition has a temperature range for the rubbery region of E' from about −10 to about 100 degrees C., the value of E' being from about $1.0 \times 10^6$ to about $1.0 \times 10^{11}$ dynes/cm$^2$.

27. The process of claim 20, wherein the phase change ink composition has a temperature range for the terminal region of E' from about 30 to about 160 degrees C.

28. The process of claim 20, wherein the L* value of a substantially uniform film of about 10 micron thickness of a black color of a phase change ink composition produced from said phase change ink composition is not more than about 35.

29. The process of claim 20, wherein the films of uniform thickness of said phase change ink composition are rectilinearly light transmissive.

30. The process of claim 20, wherein the $C^*_{ab}$ value, of a substantially uniform film of about 10 micron thickness of a subtractive primary yellow color phase change ink composition produced from said phase change ink composition is at least about 40, of a subtractive primary magenta color phase change ink composition produced from said phase change ink composition is at least about 65, of a subtractive primary cyan color modified phase change ink composition produced from said colorant composition is at least about 30.

31. The process of claim 20, wherein the glass transition temperature range of the phase change ink composition is from about −40 to about 40 degrees C.

32. The process of claim 20, wherein the temperature range for the area under the tan δ peak of the phase change ink composition is from about −80 to about 80 degrees C. with an integration area range from about 5 to about 40.

33. The process of claim 20, wherein the L* value of a substantially uniform film of about 20 micron thickness of said phase change ink composition, is at least about 65.

34. The process of claim 20, wherein the temperature range for the peak value of tan δ of the phase change ink is from about −40 to about 40 degrees C. with a tan δ of from about $1.0 \times 10^{-2}$ to about $1.0 \times 10$ at peak.

35. The process of claim 20, wherein under non-process conditions, prior to raising the temperature of said phase change ink composition to a first operating temperature or subsequent to forming a printed substrate, the yield stress value (YS) of said phase change ink, according to the equation YS=mT+I, comprises a value as defined by a slope of a yield stress and temperature curve (m). that is from about −9±−2 psi/degrees C. to about −36+−2 psi/degrees C; temperature (T) which is from about 10 to 60 degrees C.; and intercept of yield stress axis (I) which is from about 800±100 psi to 2200±100 psi.

36. The process of claim 35, wherein m is about −30±−2 psi/degrees C. and I is about 1700±100 psi.

37. The process of claim 20, wherein under process conditions, from raising the temperature of said phase change ink composition to a first operating temperature to forming a printed substrate, the yield stress value (YS) of said phase change ink, according to the equation YS=mT+I, comprises a value as defined by a slope of a yield stress and temperature curve (m) which is from about −6±−2 psi/degrees C. to about −36±−2 psi/degrees C.; temperature (T) which is from about 40 to 80 degrees C.; and intercept of yield stress axis (I) which is from about 800±100 psi to 1600±100 psi.

38. The process of claim 37, wherein m is about −9±−2 psi/degrees C. and I is about 950±100 psi.

* * * * *

UNITED STATES PATENT AND TRADEMARK OFFICE
CERTIFICATE OF CORRECTION

PATENT NO. : 5,372,852
DATED : December 13, 1994
INVENTOR(S) : Donald R. Titterington, Loc V. Bui, Linda M. Hirschy, Harold R. Frame It is certified that error appears in the above-identified patent and that said Letters Patent is hereby corrected as shown below:

Column 19, line 10, after "ink" and before "composition" delete "carder" and insert "carrier."

Column 20, line 64, after "ink" and before "composition," delete "career" and insert "carrier."

Signed and Sealed this

Thirteenth Day of October 1998

Attest:

BRUCE LEHMAN

Attesting Officer

Commissioner of Patents and Trademarks